(12) United States Patent
Sato

(10) Patent No.: US 11,301,292 B2
(45) Date of Patent: Apr. 12, 2022

(54) FLOW GENERATION DEVICE AND NON-TRANSITORY COMPUTER READABLE MEDIUM

(71) Applicant: FUJIFILM BUSINESS INNOVATION CORP., Tokyo (JP)

(72) Inventor: Chihiro Sato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 290 days.

(21) Appl. No.: 16/558,771

(22) Filed: Sep. 3, 2019

(65) Prior Publication Data

US 2020/0301705 A1    Sep. 24, 2020

(30) Foreign Application Priority Data

Mar. 22, 2019    (JP) .............................. JP2019-055056

(51) Int. Cl.
*G06F 9/48*    (2006.01)
(52) U.S. Cl.
CPC .................................. *G06F 9/4881* (2013.01)
(58) Field of Classification Search
CPC ................................................... G06F 9/4881
See application file for complete search history.

(56) References Cited

U.S. PATENT DOCUMENTS

| 9,888,141 | B2 | 2/2018 | Mihara | |
|---|---|---|---|---|
| 2009/0185219 | A1* | 7/2009 | Yagi | G06Q 10/06 358/1.15 |
| 2010/0017705 | A1* | 1/2010 | Sato | H04N 1/00448 715/243 |
| 2010/0115470 | A1* | 5/2010 | Tanji | G06F 9/5038 715/840 |
| 2011/0317938 | A1* | 12/2011 | Takasaka | G06T 3/40 382/303 |
| 2016/0037010 | A1* | 2/2016 | Mihara | H04N 1/00209 358/448 |

FOREIGN PATENT DOCUMENTS

JP    2016-33719 A    3/2016

* cited by examiner

*Primary Examiner* — Dong U Kim
(74) *Attorney, Agent, or Firm* — Oliff PLC

(57) ABSTRACT

A flow generation device includes first and second reception units, an extraction unit, a control unit, and a generation unit. The first reception unit receives a selected service process selected from among multiple service processes for generating a sequential process flow. The control unit causes the selected service process received by the first reception unit and at least one of the upstream service processes and the downstream service processes extracted by the extraction unit to be displayed on a display. The generation unit generates a process flow in which the selected service process and at least one of the upstream service process and the downstream service process are defined.

16 Claims, 19 Drawing Sheets

| SERVICE PROCESS ID | NAME | EXPLANATION | INPUT ATTRIBUTES | | |
|---|---|---|---|---|---|
| | | | INPUT FORMAT INFORMATION | | |
| | | | FORMAT | RESOLUTION (dpi) | SIZE (KByte) |
| GUID 1 | FORMAT CONVERSION | CONVERT INPUT IMAGE TO SPECIFIED FORMAT AND OUTPUT | tiff, jpeg, bmp | 200 OR GREATER | 300000 OR GREATER |
| GUID 2 | IMAGE PROCESSING | ROTATE INPUT IMAGE AND OUTPUT | tiff, bmp | 300 | 1000000 OR LESS |
| GUID 3 | DOCUMENT NAME SETTING | CHANGE NAME OF INPUT IMAGE FILE TO SPECIFIED NAME | NOT SPECIFIED | NOT SPECIFIED | NOT SPECIFIED |
| GUID 4 | OCR/QR CODE ANALYSIS | AS A RESULT OF OCR ON INPUT IMAGE, OUTPUT RESULT OF ANALYZING QR CODE IN INPUT IMAGE | pdf, tiff, bmp, jpeg, xdw | 600 | 9000000 OR LESS |
| GUID 5 | FOLDER OUTPUT | SAVE IMAGE PUT INTO SPECIFIED FOLDER TO PREDETERMINED FOLDER | pdf, tiff, bmp, jpeg, xdw, png | NOT SPECIFIED | NOT SPECIFIED |
| GUID 6 | CONFIDENTIAL BOX INPUT | SAVE IMAGE RECEIVED IN CONFIDENTIAL BOX TO PREDETERMINED FOLDER | N/A | N/A | N/A |
| GUID 7 | FAX INPUT | SAVE IMAGE RECEIVED BY FAX TO PREDETERMINED FOLDER | N/A | N/A | N/A |
| GUID 8 | zip COMPRESSION | COMPRESS INPUT FILE IN PREDETERMINED FORMAT | NOT SPECIFIED | NOT SPECIFIED | NOT SPECIFIED |
| GUID 9 | EMAIL TRANSMISSION | TRANSMIT INPUT IMAGE BY EMAIL TO PREDETERMINED ADDRESS | NOT SPECIFIED | NOT SPECIFIED | 2000000 OR LESS |
| GUID 10 | PRINT FUNCTION | PRINT INPUT IMAGE | tiff, jpeg, xdw, pdf | NOT SPECIFIED | 2000000 OR LESS |
| ... | ... | ... | ... | ... | ... |
| GUID N | CLOUD STORAGE REGISTRATION | SAVE INPUT IMAGE IN PREDETERMINED LOCATION OF CLOUD STORAGE | NOT SPECIFIED | NOT SPECIFIED | 15000000 OR LESS |

|  | OUTPUT ATTRIBUTES | | | | | SERVICE PROCESS DATA |
|---|---|---|---|---|---|---|
| INPUTTABLE PARAMETER TYPES | OUTPUT FORMAT INFORMATION | | | OUTPUTTABLE PARAMETER TYPES | | |
| | FORMAT | RESOLUTION (dpi) | SIZE (byte) | | | |
| STRING, VALUE | pdf, tiff, jpeg, bmp, xdw | 200 OR GREATER | 300000 OR GREATER, 2000000 OR LESS | Boolean, STRING, VALUE | | ***** |
| Boolean, STRING, VALUE | tiff, bmp | 300 OR GREATER | 300000 OR GREATER, 1000000 OR LESS | Boolean, STRING, VALUE | | ***** |
| STRING | NOT SPECIFIED | NOT SPECIFIED | NOT SPECIFIED | STRING, VALUE | | ***** |
| Boolean, STRING, VALUE | txt, pdf, doc, docx, xls, xlsx, ppt, pptx, rtf, tiff, bmp | 600 | 300000 OR GREATER, 9000000 OR LESS | STRING, VALUE, CURRENCY | | ***** |
| STRING | N/A | N/A | N/A | N/A | | ***** |
| N/A | tiff, jpeg, bmp, png, pdf, xdw | 200 OR GREATER | NOT SPECIFIED | STRING, VALUE, DATE, TIME | | ***** |
| N/A | tiff, jpeg, bmp | 200 | 300000 OR GREATER, 1000000 OR LESS | STRING, VALUE | | ***** |
| Boolean, STRING, VALUE | zip | NOT SPECIFIED | 300000 OR GREATER, 10000000 OR LESS | STRING, VALUE | | ***** |
| Boolean, STRING, VALUE | N/A | N/A | N/A | N/A | | ***** |
| Boolean, STRING, VALUE | N/A | N/A | N/A | VALUE, CURRENCY | | ***** |
| ... | ... | ... | ... | ... | | ... |
| Boolean, VALUE | N/A | N/A | N/A | N/A | | ***** |

FROM FIG. 5A

FLOW GENERATION DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-055056 filed Mar. 22, 2019.

BACKGROUND

(i) Technical Field

The present disclosure relates to a flow generation device and a non-transitory computer readable medium.

(ii) Related Art

Japanese Unexamined Patent Application Publication No. 2016-033719 discloses an information processing device including a processing control unit that executes one or more units of processing with respect to input data in an order defined by definition information, and a selection unit that, on the basis of output information about one from among the one or more units of processing, selects a unit of processing to be executed by the processing control unit from among multiple units of processing defined as candidates executed next after an identical unit of processing in the definition information.

SUMMARY

In the case of generating a process flow combining multiple service processes that execute a predetermined process on input data and that output output data, if there are conditions on the content that is processable by each of the service processes, it may become extremely burdensome for a user to select combinable service processes from among a large number of service processes and generate a process flow.

Aspects of non-limiting embodiments of the present disclosure relate to generating process flows easily compared to the case of having a user make judgments one at a time about service processes combinable under certain conditions to generate a process flow.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a flow generation device including first and second reception units, an extraction unit, a control unit, and a generation unit. The first reception unit receives a selected service process selected from among multiple service processes for generating a sequential process flow. In a case in which the selected service process is a process that receives input data, the extraction unit extracts one or more upstream service processes which have output attributes satisfying at least a portion of input attributes of the input data and which are also executed upstream from the selected service process, and in a case in which the selected service process is a process that outputs output data, the extraction unit extracts one or more downstream service processes which have input attributes satisfying at least a portion of output attributes of the output data and which are also executed downstream from the selected service process. The control unit causes the selected service process received by the first reception unit and at least one of the upstream service processes and the downstream service processes extracted by the extraction unit to be displayed on a display. In a case in which the selected service process is a process that receives the input data, the second reception unit receives an upstream service process selected from among the one or more upstream service processes displayed on the display, and in a case in which the selected service process is a process that outputs the output data, the second reception unit receives a downstream service process selected from among the one or more downstream service processes displayed on the display. The generation unit generates a process flow in which the selected service process and at least one of the upstream service process and the downstream service process are defined.

BRIEF DESCRIPTION OF THE DRAWINGS

An exemplary embodiment of the present disclosure will be described in detail based on the following figures, wherein:

FIGS. 5A and 5B are diagrams illustrating one example of a service process database;

DETAILED DESCRIPTION

Hereinafter, an exemplary embodiment for carrying out the present disclosure will be described in detail and with reference to the drawings.

Figure 1:
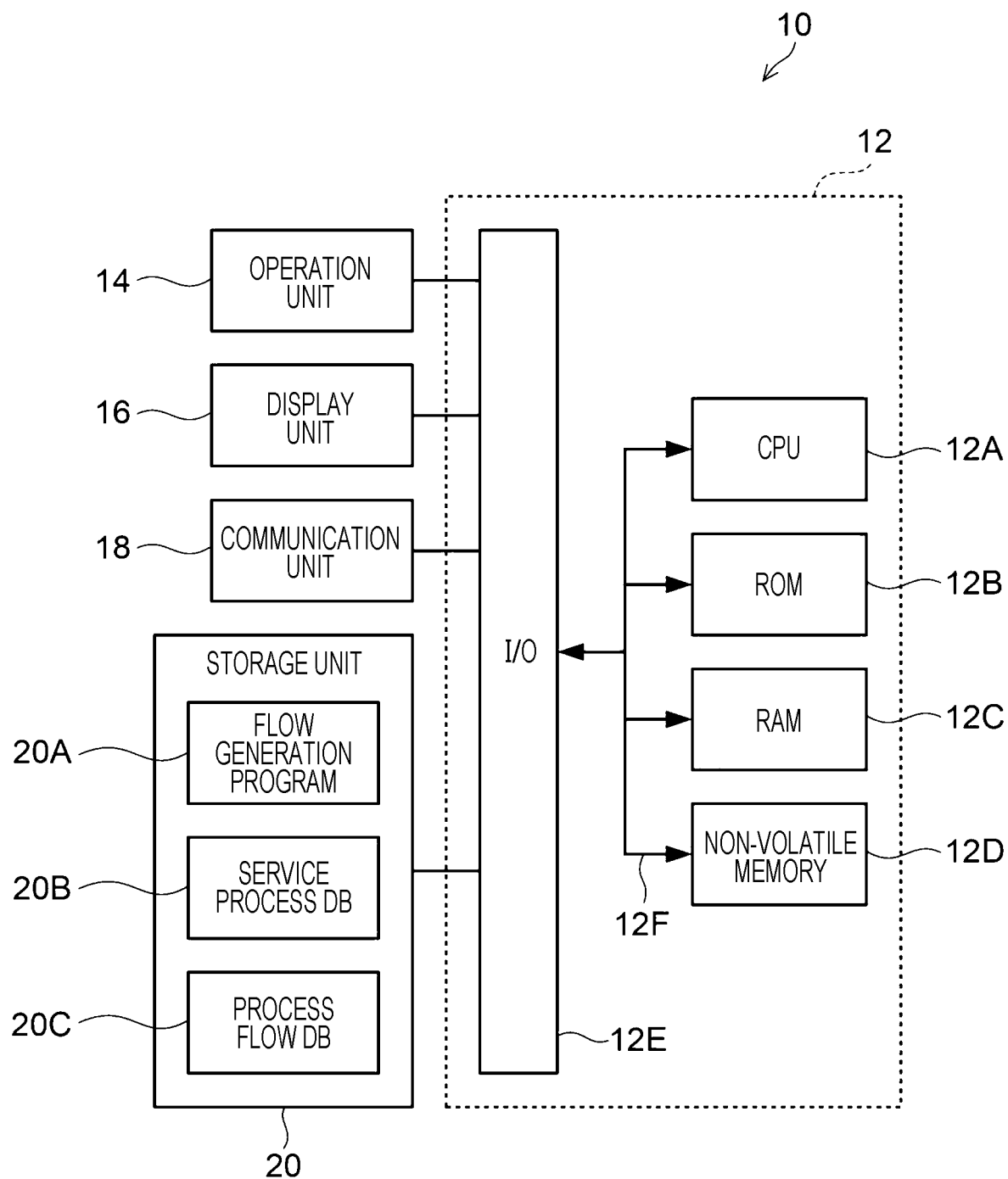
FIG. 1 is a schematic configuration diagram illustrating a configuration of a flow generation device.

FIG. 1 is a configuration diagram of a flow generation device 10. The flow generation device 10 is a device including a typical computer, and is configured with a personal computer or the like, for example.

As illustrated in FIG. 1, the flow generation device 10 is provided with a controller 12. The controller 12 is provided with a central processing unit (CPU) 12A, read-only memory (ROM) 12B, random access memory (RAM) 12C, non-volatile memory 12D, and an input/output interface (I/O) 12E. Additionally, the CPU 12A, the ROM 12B, the RAM 12C, the non-volatile memory 12D, and the I/O 12E are interconnected via a bus 12F.

Also connected to the I/O 12E are an operation unit 14, a display unit 16, a communication unit 18, and a storage unit 20.

The operation unit 14 includes a mouse and a keyboard, for example.

The display unit 16 includes a liquid crystal display or the like, for example.

The communication unit 18 is an interface for data communication with external devices.

The storage unit 20 includes a non-volatile storage device such as a hard disk, and stores a flow generation program 20A, a service process database (DB) 20B, a process flow database (DB) 20C, and the like described later. The CPU 12A loads and executes the flow generation program 20A stored in the storage unit 20.

Next, a functional configuration of the CPU 12A in the case in which the flow generation device 10 executes the flow generation program 20A will be described.

Figure 2:
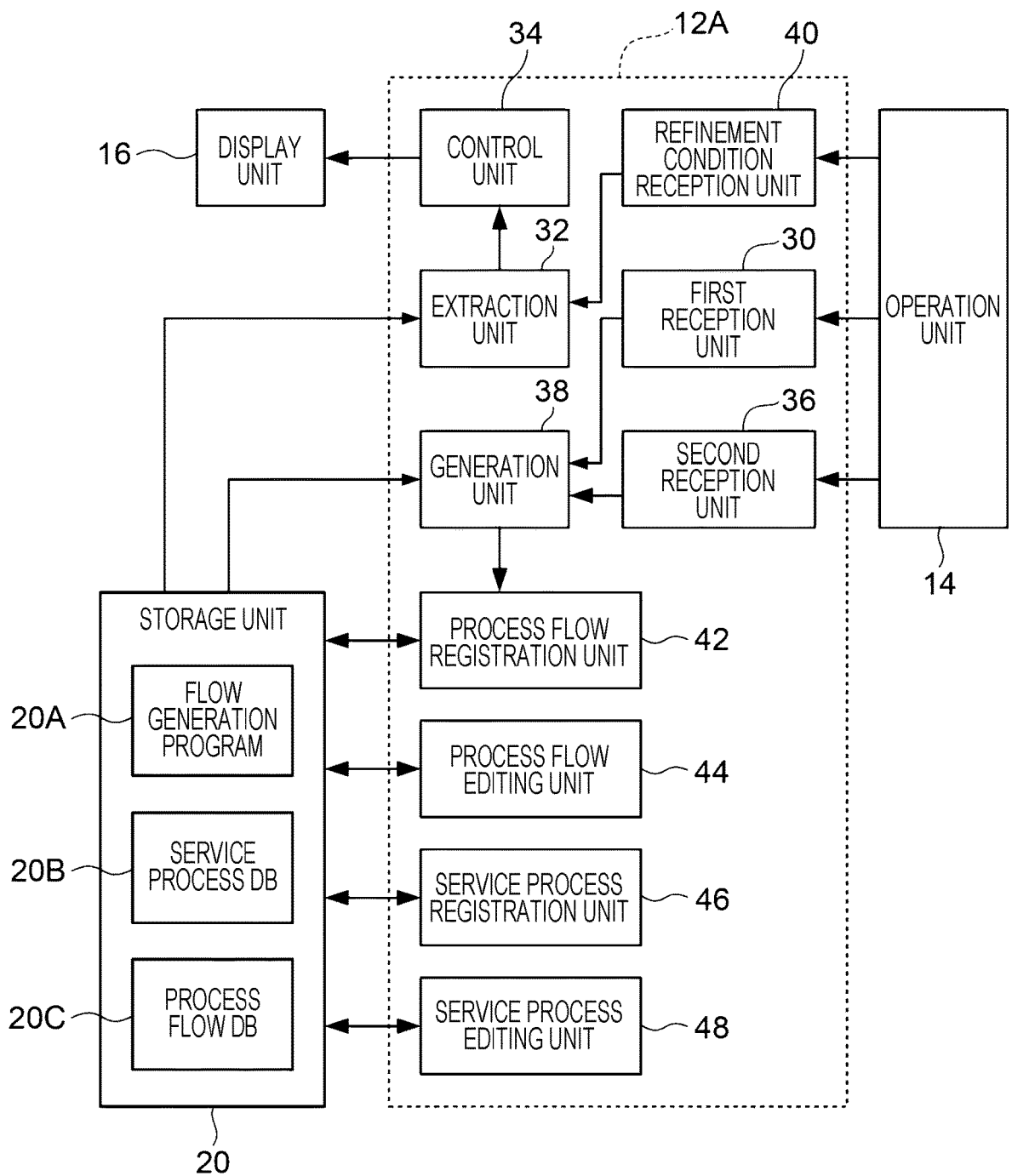
FIG. 2 is a block diagram illustrating a functional configuration of the flow generation device.

As illustrated in FIG. 2, the CPU 12A functionally is provided with a first reception unit 30, an extraction unit 32, a control unit 34, a second reception unit 36, a generation unit 38, a refinement condition reception unit 40, a process flow registration unit 42, a process flow editing unit 44, a service process registration unit 46, and a service process editing unit 48.

The first reception unit 30 receives a selected service process selected from among multiple service processes for generating a sequential process flow. Herein, a service process is a process that forms part of a sequential process flow. Services process may take one of three forms: a first form that executes a predetermined process on input data, a second form that executes a predetermined process and outputs output data, and a third form that executes a predetermined process on input data and outputs output data. The user selects the service processes to form a sequential process flow from among the multiple service processes.

In the case in which a selected service process selected by the user receives input data, or in other words, in the case of a process of the first form or a process of the third form, the extraction unit 32 extracts one or more upstream service processes which have output attributes that satisfy at least a portion of input attributes of the input data, and which are also executed upstream from (that is, before) the selected service process.

Herein, as one example in the present exemplary embodiment, the input attributes include at least one of input format information related to the format of input data receivable by the selected service process, and an inputtable parameter type that is inputtable into the selected service process.

Also, as one example in the present exemplary embodiment, the output attributes include at least one of output format information related to the format of output data output by the selected service process, and an outputtable parameter type that is outputtable by the selected service process.

Additionally, in the case in which the selected service process is a process that outputs output data, or in other words, in the case of a process of the second form or a process of the third form, the extraction unit 32 extracts one or more downstream service processes which have input attributes that satisfy at least a portion of output attributes of the output data, and which are also executed downstream from (that is, after) the selected service process.

In this way, in the case in which the selected service process is a process of the first form, upstream service processes are extracted. Also, in the case in which the selected service process is a process of the second form, downstream service processes are extracted. Also, in the case in which the selected service process is a process of the third form, both upstream service processes and downstream service processes are extracted.

The control unit 34 causes the selected service process received by the first reception unit 30 and at least one of upstream service processes and downstream service processes extracted by the extraction unit 32 to be displayed on the display unit 16. The user selects a service process to be executed upstream from the selected service process from among the upstream service processes displayed on the display unit 16. Also, the user selects a service process to be executed downstream from the selected service process from among the downstream service processes displayed on the display unit 16.

In the case in which the selected service process is a process that receives input data, or in other words, in the case in which the selected service process is a process of the first form or a process of the third form, the second reception unit 36 receives a service process selected from among the upstream service processes displayed on the display unit 16, whereas in the case in which the selected service process is a process that outputs output data, or in other words, in the case in which the selected service process is a process of the second form or a process of the third form, the second reception unit 36 receives a service process selected from among the downstream service processes displayed on the display unit 16.

The generation unit 38 generates a process flow in which the selected service process received by the first reception unit 30, and at least one of an upstream service process and a downstream service process received by the second reception unit 36, are defined.

The refinement condition reception unit 40 receives a refinement condition for refining at least one of the upstream service processes and the downstream service processes extracted by the extraction unit 32. In this case, the extraction unit 32 extracts at least one of an upstream service process and a downstream service process satisfying the refinement condition.

The process flow registration unit 42 registers a process flow generated by the generation unit 38 in the storage unit 20.

The process flow editing unit 44 edits a process flow registered in the storage unit 20 by the process flow registration unit 42. In the case in which a service process included in the process flow is edited by the process flow editing unit 44, the extraction unit 32 may be configured to re-extract at least one of an upstream service process and a downstream service process corresponding to the service process edited by the process flow editing unit 44.

The service process registration unit 46 registers a new service process in the storage unit 20.

The service process editing unit 48 edits a service process registered in the storage unit 20 by the service process registration unit 46.

Note that the control unit 34 may cause a notification to be issued in at least one of a case in which an output attribute not matching an input attribute of the selected service process exists among the output attributes of the upstream service process received by the second reception unit 36, and a case in which an input attribute not matching an output attribute of the selected service process exists among the input attributes of the downstream service process received by the second reception unit 36.

Also, the control unit 34 may be configured to execute at least one of a process causing an output attribute matching an input attribute of the selected service process and an output attribute not matching an input attribute of the selected service process from among the output attributes of the upstream service process received by the second reception unit 36 to be displayed distinguished from each other, and a process causing an input attribute matching an output attribute of the selected service process and an input attribute not matching an output attribute of the selected service process from among the input attributes of the downstream service process received by the second reception unit 36 to be displayed distinguished from each other.

Also, in the case in which any service process from among the selected service process received by the first reception unit 30, the upstream service processes extracted by the extraction unit 32, and the downstream service processes extracted by the extraction unit 32 is indicated, the control unit 34 may cause at least one of an input attribute, an output attribute, and an explanation of the indicated service process to be displayed on the display unit 16.

In addition, the first reception unit 30 may also receive a first grouping condition for grouping multiple service processes. In this case, the control unit 34 may cause the display unit 16 to display multiple service processes grouped in accordance with the first grouping condition.

Also, the second reception unit 36 may also receive a second grouping condition for grouping at least one of the upstream service processes and the downstream service processes extracted by the extraction unit 32. In this case, the control unit 34 may cause the display unit 16 to display at least one of the upstream service processes and the downstream service processes extracted by the extraction unit 32 grouped in accordance with the second grouping condition.

Figure 3:
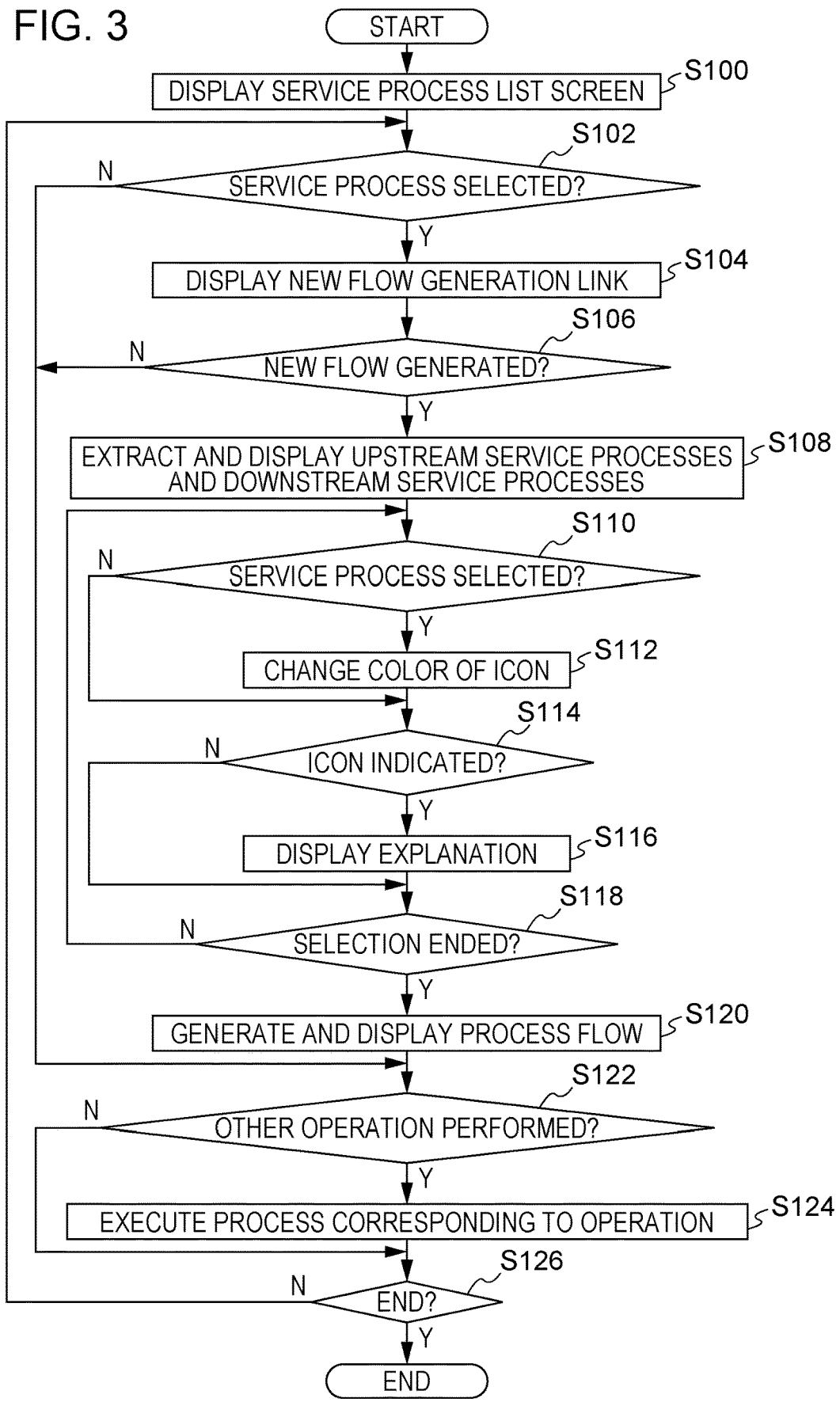
FIG. 3 is a flowchart illustrating one example of the flow of a flow generation process.

Next, the action of the flow generation device 10 according to the present exemplary embodiment will be described. As illustrated in FIG. 2, the flow generation program 20A is stored in the storage unit 20. By having the CPU 12A read out and execute the flow generation program 20A, the flow generation process illustrated in FIG. 3 is executed. Note that the flow generation process illustrated in FIG. 3 is executed in the case where the user gives an instruction to execute the flow generation process.

Figure 4:
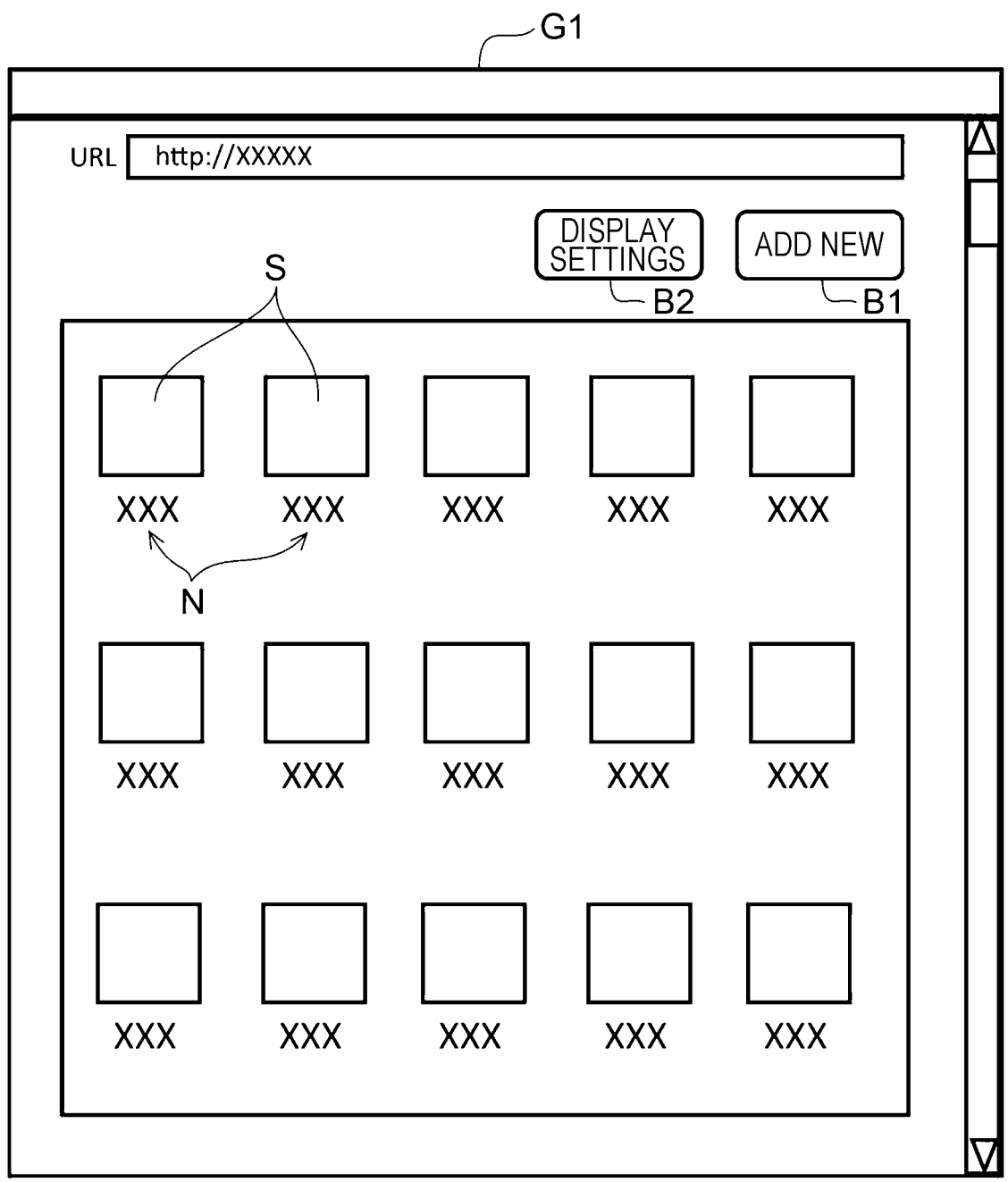
FIG. 4 is a diagram illustrating one example of a service process list screen.

In step S100, the service process DB 20B stored in the storage unit 20 is referenced, and a service process list screen G1 as illustrated in FIG. 4 is displayed on the display unit 16.

As illustrated in FIG. 4, on the service process list screen G1, an icon S and a name N are displayed for every service process. Also displayed on the service process list screen G1 are an Add New button B1 pressed in the case of newly adding a service process, and a Display Settings button B2 pressed in the case of displaying the service processes grouped together.

FIGS. 5A and 5B illustrate one example of the service process DB 20B. As illustrated in FIGS. 5A and 5B, the service process DB 20B is a database in which service process information, which includes a service process ID, a name, an explanation, input attributes, output attributes, and service process data, is registered for every service process.

Note that the input attributes include input format information and inputtable parameter types. Also, the output attributes include output format information and outputtable parameter types.

The service process ID is an identification sign for uniquely specifying a service process.

The name of a service process is a name given to the service process, and as illustrated in FIG. 4, is displayed below each icon S.

The explanation of a service process is explanatory text related to the specific processing content of the service process.

As one example in the present exemplary embodiment, the input format information is the format, resolution, and size of the input data. Similarly, the output format information is the format, resolution, and size of the output data. Note that the input format information and the output format information are not limited to format, resolution, and size, and may also include other information such as color information.

The formats of the input data are the formats processable by the service process, and as illustrated in FIG. 5A, may be formats such as Tagged Image File Format (TIFF) and Joint Photographic Experts Group (JPEG) for example, but the formats are not limited to these.

The resolution of the input data may be specified as a fixed value such as "200 dpi" for example, but may also be specified as a range, such as "less than 200 dpi", "200 dpi or greater", or "200 dpi or greater and 1000 dpi or less".

Similarly to the resolution, the size of the input data may also be specified as a fixed value or as a range.

The inputtable parameter types are classes of external parameters that may be given to the service process from an external source, such as parameters output from an upstream service process for example. Examples of inputtable parameter types include text string, numerical value, Boolean, date, time, currency, and the like, but are not limited thereto.

The formats of the output data are the formats of the output data output as a result of the processing performed by the service process, and are similar to the formats of the input data. Note that the resolution and size of the output data are similar to the resolution and size of the input data.

The outputtable parameter types are types of parameters output by the service process, and are similar to the inputtable parameter types.

Note that when the input attributes and the output attributes are not particularly specified, that is, not particularly restricted, the attributes are designated "Not Specified". Also, when the input attributes and the output attributes are not applicable, the attributes are designated "N/A". Consequently, the case in which the input attributes are all "N/A" means that the service process does not receive input data, or in other words, an upstream service process is unnecessary. Also, the case in which the output attributes are all "N/A" means that the service process does not output output data, or in other words, a downstream service process is unnecessary.

The service process data is various data related to the service process other than the above information, and for example includes a program for executing the service process or the like. Note that in the present exemplary embodiment, a detailed description regarding the service process data is omitted.

The user clicks with a mouse or the like to select the icon S of a desired service process from among the list of service processes displayed on the service process list screen G1 in FIG. 4.

Note that in the state of FIG. 4, in the case in which the icon S of one of the service processes is indicated, at least one of the input attributes, the output attributes, and the explanation of the service process corresponding to the indicated icon S may be displayed near the icon S. With this arrangement, it becomes easier for the user to grasp what kind of process is executed by the indicated service process. Also, instead of or in addition to the explanation, at least one of the input attributes and the output attributes may be displayed.

In step S102, it is determined whether or not a service process has been selected. Subsequently, in the case in which a service process has been selected, the flow proceeds to step S104, whereas in the case in which a service process has not been selected, the flow proceeds to step S122.

Figure 6:
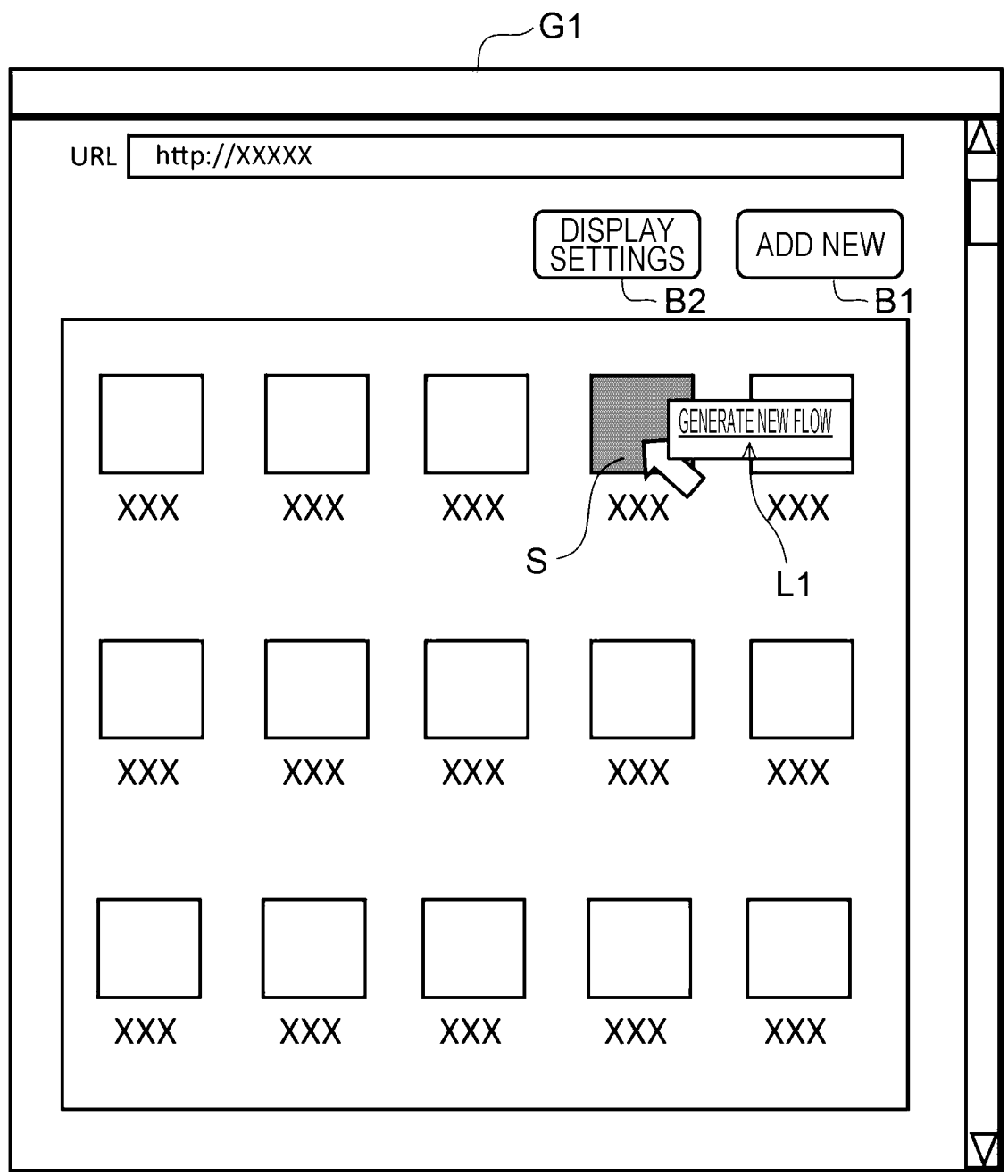
FIG. 6 is a diagram illustrating one example of a service process list screen.

In step S104, as illustrated in FIG. 6, the color of the selected icon S is changed, and in addition, a new flow generation link L1 pressed in the case of newly creating a process flow is displayed. At this point, if the user presses the new flow generation link L1, a new process flow is started.

Accordingly, in step S106, it is determined whether or not the new flow generation link L1 has been pressed. Subsequently, in the case in which the new flow generation link L1 has been pressed, the flow proceeds to step S108, whereas in the case in which the new flow generation link L1 has not been pressed, the flow proceeds to step S122.

In step S108, the service process DB 20B is referenced, upstream service processes and downstream service processes corresponding to the selected service process selected by the user are extracted, and the extracted upstream service processes and downstream service processes are displayed on the display unit 16.

In other words, service processes having output attributes that satisfy at least a portion of the input attributes of the input data of the selected service process are extracted as the upstream service processes. Note that in the case in which the selected service process is a process that does not receive input data, the process of extracting upstream service processes is unnecessary.

Specifically, all service processes that include a format of the input data of the selected service process as a format of the output data, include a resolution of the input data of the selected service process as a resolution of the output data, include a size of the input data of the selected service process as a size of the output data, and include an inputtable parameter type of the input data of the selected service process as an outputtable parameter type of the output data are extracted as upstream service processes.

Also, service processes having input attributes that satisfy at least a portion of the output attributes of the output data of the selected service process are extracted as the downstream service processes. Note that in the case in which the selected service process is a process that does not output output data, the process of extracting downstream service processes is unnecessary.

Specifically, all service processes that include a format of the output data of the selected service process as a format of the input data, include a resolution of the output data of the selected service process as a resolution of the input data, include a size of the output data of the selected service process as a size of the input data, and include an outputtable parameter type of the input data of the selected service process as an inputtable parameter type of the input data are extracted as downstream service processes.

For example, suppose that the format conversion process having the service process ID "GUID 1" illustrated in FIG. 5A is selected as the selected service process. In this case, because the service processes having output attributes that satisfy at least a portion of the input attributes of the format conversion process are the format conversion process of GUID 1, the image processing process of GUID 2, the OCR/QR code (registered trademark) analysis process of GUID 4, the confidential box input process of GUID 6, and the fax input process of GUID 7, these service processes are extracted as the upstream service processes. Note that because the document name setting process of GUID 3 and the ZIP compression process of GUID 8, in which the resolution of the output attributes is "Not Specified", output output data at a resolution unsupported by the format conversion process that is the selected service process, these processes are not extracted as upstream service processes. Also, the folder output process of GUID 5, the email transmission process of GUID 9, and the print function of GUID 10 do not output output data in the first place, and therefore are not extracted.

Also, because the service processes having input attributes that satisfy at least a portion of the output attributes of the output data of the format conversion process that is the selected service process are the format conversion process of GUID 1, the image processing process of GUID 2, the document name setting process of GUID 3, the OCR/QR code (registered trademark) analysis process of GUID 4, the folder output process of GUID 5, the ZIP compression process of GUID 8, the email transmission process of GUID 9, and the cloud storage registration process of GUID N, these service processes are extracted as the downstream service processes.

Figure 7:
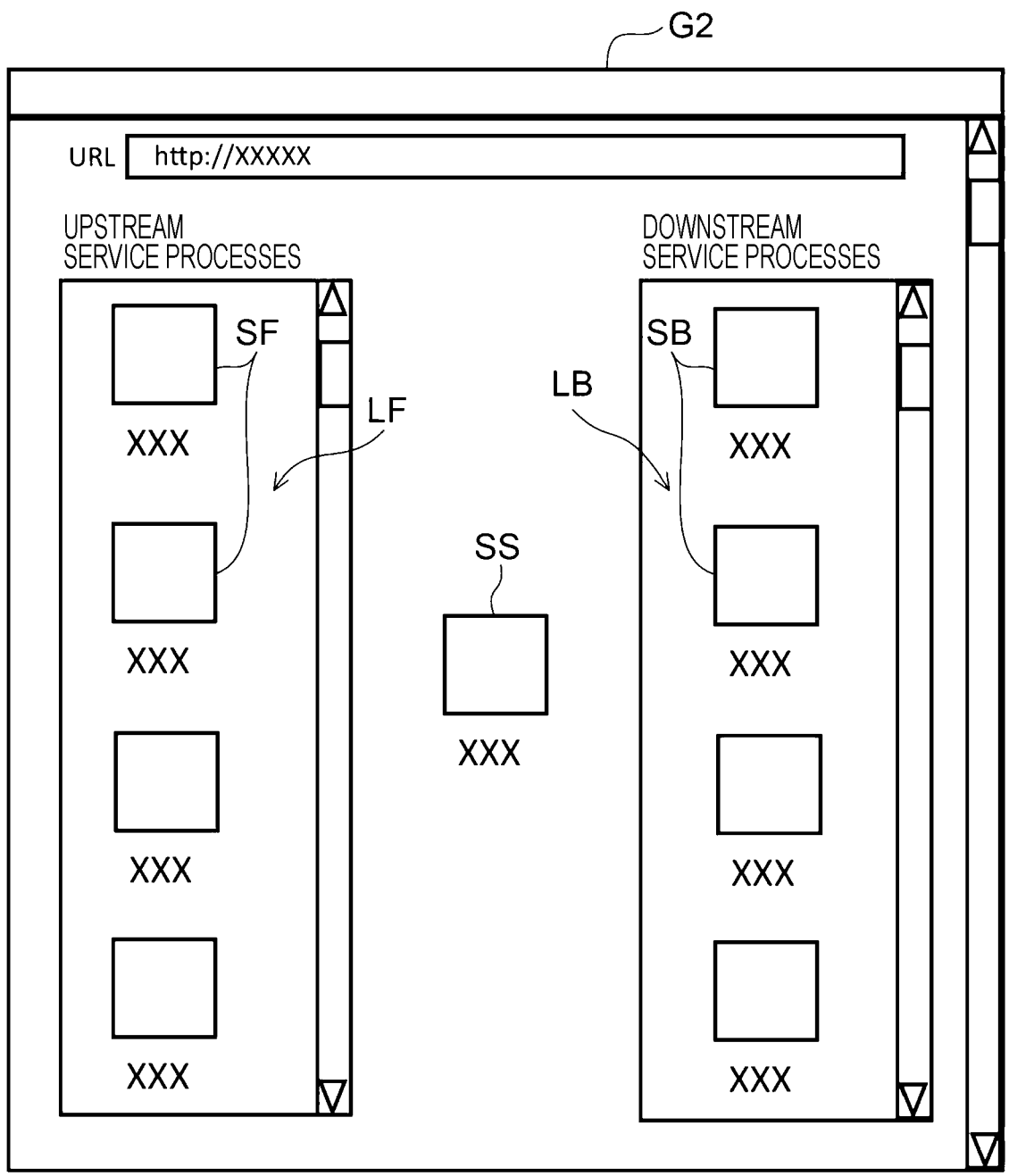
FIG. 7 is a diagram illustrating one example of a display of extracted upstream service processes and downstream service processes.

FIG. 7 illustrates a display screen G2 that displays the extracted upstream service processes and downstream service processes. As illustrated in FIG. 7, on the display screen G2, an icon SS of the selected service process is displayed in the center, a list LF of upstream service processes SF is displayed to the left of the selected service process, and a list LB of downstream service processes SB is displayed to the right of the selected service process.

The user clicks with a mouse or the like to select at least one or more upstream service processes from among the upstream service processes included in the list LF. Note that an upstream service process does not have to be selected if one is unnecessary. In addition, the user clicks with a mouse or the like to select at least one or more downstream service processes from among the downstream service processes included in the list LB. Note that a downstream service process does not have to be selected if one is unnecessary.

Also, in the above example, service processes having output attributes that partially encompass at least a portion of the input attributes of the input data of the selected service process are extracted as the upstream service processes. For this reason, depending on the output attributes of the output data that is output by the upstream service process, the selected service process may be unable to process the input data in some cases. Accordingly, service processes having output attributes that completely encompass at least a portion of the input attributes of the input data of the selected service process may be extracted as the upstream service processes. In this case, the output attributes of the output data that is output by the upstream service process are certain to satisfy the input attributes of the selected service process, and therefore the selected service process will not be unable to process the input data. In the above example, only the fax process is extracted as the upstream service process.

Similarly, in the above example, service processes having input attributes that partially encompass at least a portion of the output attributes of the output data of the selected service process are extracted as the downstream service processes. For this reason, depending on the output attributes of the output data that is output by the selected service process, the downstream service process may be unable to process the input data in some cases. Accordingly, service processes having input attributes that completely encompass at least a portion of the output attributes of the output data of the selected service process may be extracted as the downstream service processes. In this case, the output attributes of the output data that is output by the selected service process are certain to satisfy the input attributes of the downstream service process, and therefore the downstream service process will not be unable to process the input data. In the above example, only the OCR/QR code (registered trademark) analysis process is extracted as the downstream service process.

In step S110, it is determined whether or not any of the upstream service processes and downstream service processes has been selected. Subsequently, in the case in which any of the upstream service processes and downstream service processes has been selected, the flow proceeds to step S112. On the other hand, in the case in which none of the upstream service processes and downstream service processes has been selected, the flow proceeds to step S114.

Figure 8:
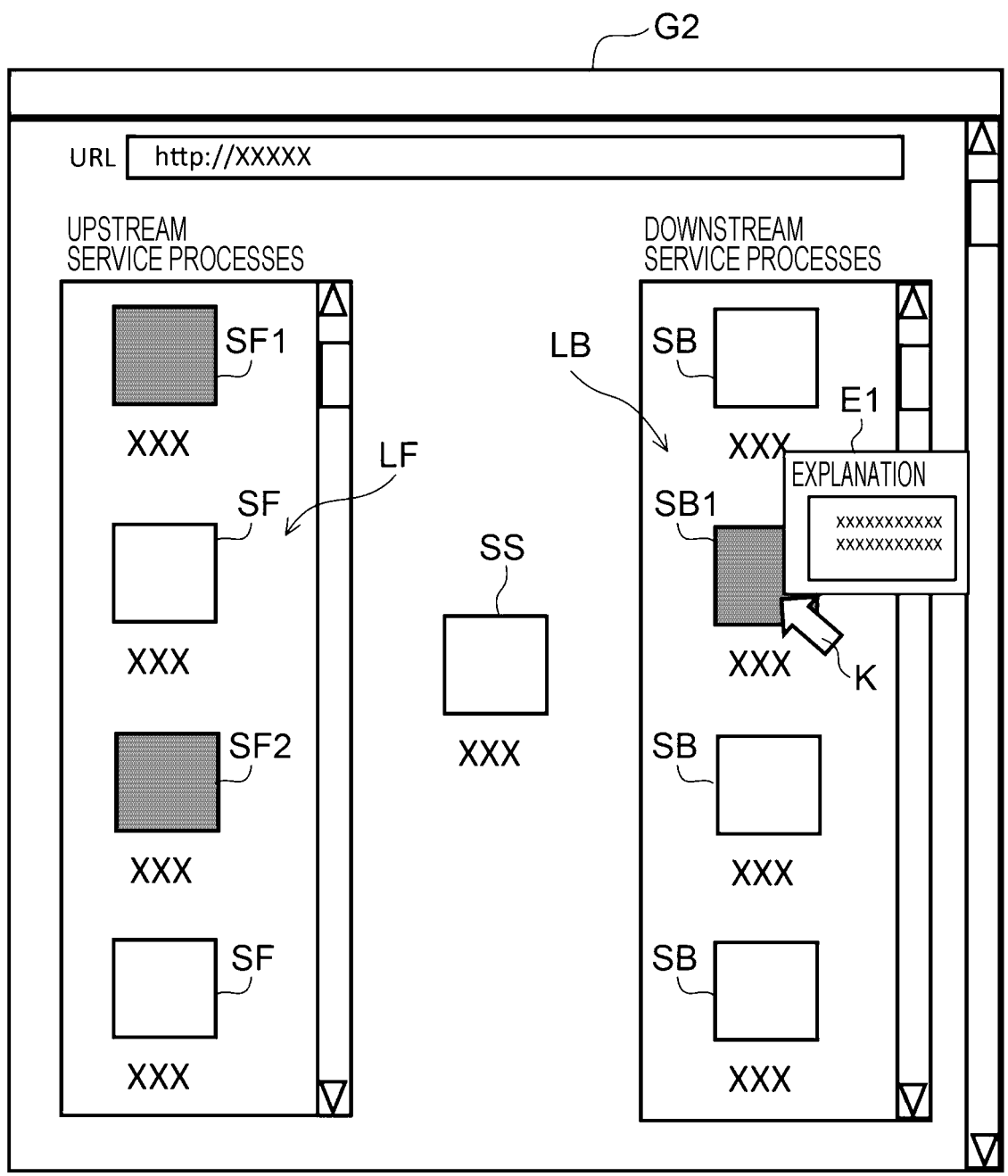
FIG. 8 is a diagram illustrating one example of a display of extracted upstream service processes and downstream service processes.

In step S112, the color of the icon of each selected service process is changed. As illustrated in FIG. 8 for example, in the case in which a mouse is clicked or the like to select the icons SF1 and SF2 of the upstream service processes included in the list LF, the icons SF1 and SF2 are displayed in a different color from the icons SF of the unselected upstream service processes. Note that the process is not limited to the case of changing the color, and a frame around the icon of each selected service process may also be emphasized or the like. In other words, it is sufficient for selected service processes and unselected service processes to be displayed in a manner distinguished from each other. Similarly, in the case in which a mouse is clicked or the like to select the icon SB1 of a downstream service process included in the list LB, the icon SB1 is displayed in a different color from the icons SB of the unselected downstream service processes.

Note a notification may also be issued in at least one of a case in which an output attribute not matching an input attribute of the selected service process exists among the output attributes of the selected upstream service process or processes, and a case in which an input attribute not matching an output attribute of the selected service process exists among the input attributes of the selected downstream service process or processes. Note that the mode of the notification may be the display of a message, the output of a warning sound, or the like, but is not limited thereto.

With this arrangement, it becomes easier for the user to grasp whether or not at least one of the selected upstream service processes and downstream service processes is a service process compatible with the selected service process.

In step S114, it is determined whether or not the icon of any of the upstream service processes and downstream service processes has been indicated. In other words, for example, it is determined whether or not a mouse operation performed by the user has moved a cursor over of the icon of any of the upstream service processes and downstream service processes. Subsequently, in the case in which an icon has been indicated, the flow proceeds to step S116, whereas in the case in which an icon has not been indicated, the flow proceeds to step S118.

In step S116, at least one of the input attributes, the output attributes, and the explanation of the indicated service process is displayed on the display unit 16.

For example, as illustrated in FIG. 8, in the case in which the icon SB1 of a downstream service process is indicated with a cursor K, an explanation E1 of the downstream service process corresponding to the icon SB1 is acquired from the service process DB 20B and displayed near the icon SB1. With this arrangement, the user grasps what kind of service process is the indicated service process. Note that the example in FIG. 8 is the case of displaying the explanation of the service process corresponding to the indicated icon, but at least one of the input attributes and the output attributes may also be display instead of or in addition to the explanation.

Also, in the case of displaying the input attributes and the output attributes, at least one of a process causing an output attribute matching an input attribute of a selected service process or processes and an output attribute not matching an input attribute of the selected service process or processes from among the output attributes of the selected upstream service process or processes to be displayed distinguished from each other, and a process causing an input attribute matching an output attribute of the selected service process or processes and an input attribute not matching an output attribute of the selected service process or processes from among the input attributes of the selected downstream service process or processes to be displayed distinguished from each other may be executed. Note that the mode of displaying attributes distinguished from each other may be distinguishing with a message indicating which attributes do or do not match, distinguishing by color, distinguishing with a frame, or the like, but is not limited thereto.

In step S118, it is determined whether or not the selection of upstream service processes and downstream service processes has ended. Specifically, it is determined whether or not an operation of ending the selection of upstream service processes and downstream service processes has been performed. Subsequently, in the case in which the selection of upstream service processes and downstream service processes has ended, the flow proceeds to step S120. On the other hand, in the case in which the selection has not ended, the flow returns to step S110, and the processes from step S110 to step S116 are repeated until the selection ends.

In step S120, a process flow is generated in which the selected service process selected in step S102 and at least one of an upstream service process and a downstream service process selected in step S110 are defined.

For example, as illustrated in FIG. 8, in the case in which the icons SF1 and SF2 are selected from the list LF of upstream service processes and the icon SB1 is selected from the list LB of downstream service processes, a process flow containing the upstream service processes corresponding to the icons SF1 and SF2, the selected service process corresponding to the icon SS, and the downstream service process corresponding to the icon SB1 is generated, and the generated process flow is registered in the process flow DB 20C stored in the storage unit 20.

Figure 9:
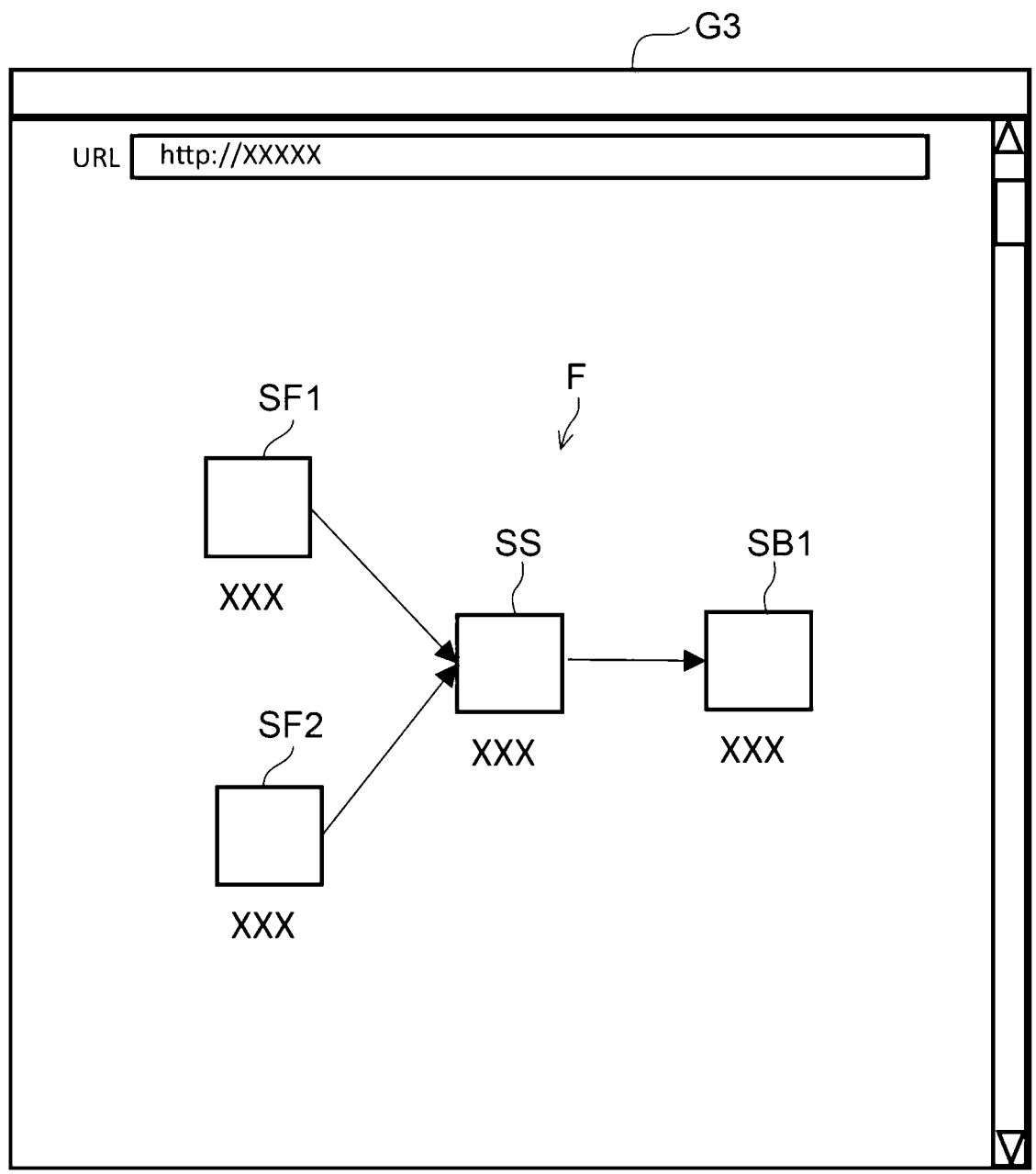
FIG. 9 is a diagram illustrating one example of a display of a process flow.

Additionally, as illustrated in FIG. 9, a display screen G3 is displayed on the display unit 16. Displayed on the display screen G3 is a process flow F in which the icons SF1 and SF2 of the upstream service processes, the icon SS of the selected service process, and the icon SB1 of the downstream service process are connected by arrows. Subsequently, in the case in which there is an operation to end the display of the process flow F, the service process list screen G1 illustrated in FIG. 4 is displayed, and the process of step S120 is ended.

Figure 10:
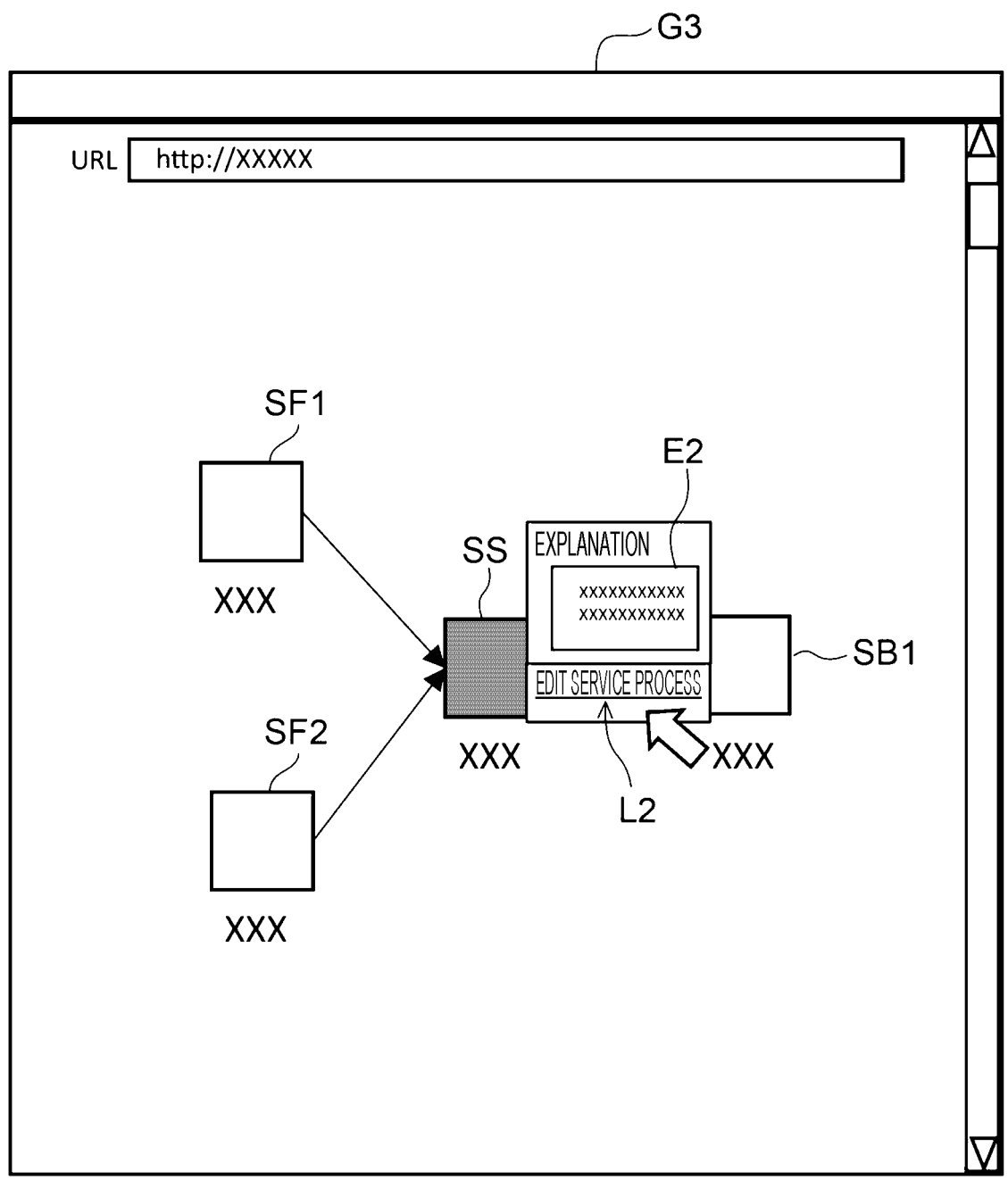
FIG. 10 is a diagram illustrating one example of a display of a process flow.

Also, as illustrated in FIG. 10, in the case in which the icon SS of the selected service process is selected for example, an explanation E2 of the selected service process corresponding to the icon SS may be displayed. Furthermore, a service process editing link L2 pressed in the case of editing the selected service process may also be displayed. In the case in which the service process editing link L2 is pressed, a process of editing the selected service process is executed.

Figure 11:
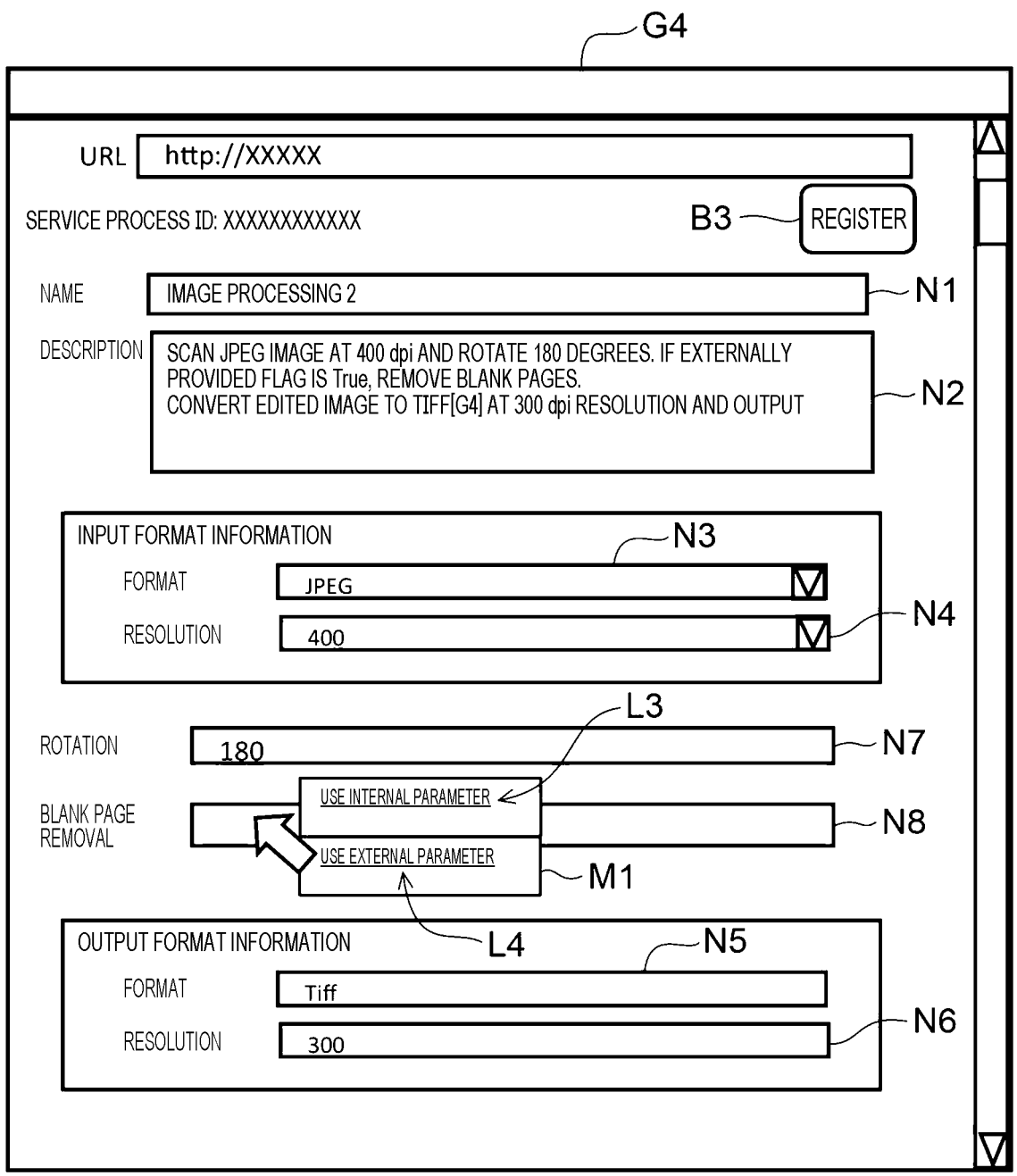
FIG. 11 is a diagram illustrating one example of a service process editing screen.

In the process of editing the selected service process, an editing screen G4 like the one illustrated in FIG. 11 is displayed on the display unit 16.

As illustrated in FIG. 11, on the editing screen G4, the service process ID of the service process to edit is displayed. Also, on the editing screen G4, an input field N1 for inputting the name, an input field N2 for inputting the explanation of the service process, input fields N3 and N4 for inputting the format and resolution of the input format information, and input fields N5 and N6 for inputting the format and resolution of the output format information are displayed as editable service process information from among the service process information of the service process to edit. Also, on the editing screen G4, input fields N7 and N8 for inputting parameters related to the execution of the service process as well as a Register button B3 are displayed.

Herein, in each input field, the currently set value or string is displayed, which the user edits as appropriate.

The example in FIG. 11 is an example of the case in which the selected service process is image processing. Additionally, "Rotation" and "Blank page removal" are settable as parameters. Herein, in the case in which the input data is a document for example, "Rotation" is a parameter for specifying how many degrees to rotate the document. Also, in the case in which the input data is a document for example, "Blank page removal" is a parameter for specifying whether or not to remove blank pages from the document.

Also, as illustrated in FIG. 11, in the case where the parameter "Blank page removal" is indicated for example, a menu M1 is displayed. The menu M1 includes a link L3 pressed in the case of using an internal parameter for "Blank page removal", and a link L4 pressed in the case of using an external parameter for "Blank page removal".

Additionally, by having the user press the link L3 or the link L4, the use of the external parameter or the use of the internal parameter for "Blank page removal" is set. At this point, in the case in which the internal parameter is selected, the parameter set on the editing screen G4 is used. On the other hand, in the case in which the external parameter is selected, the parameter output by the upstream service process is used.

Figure 12:
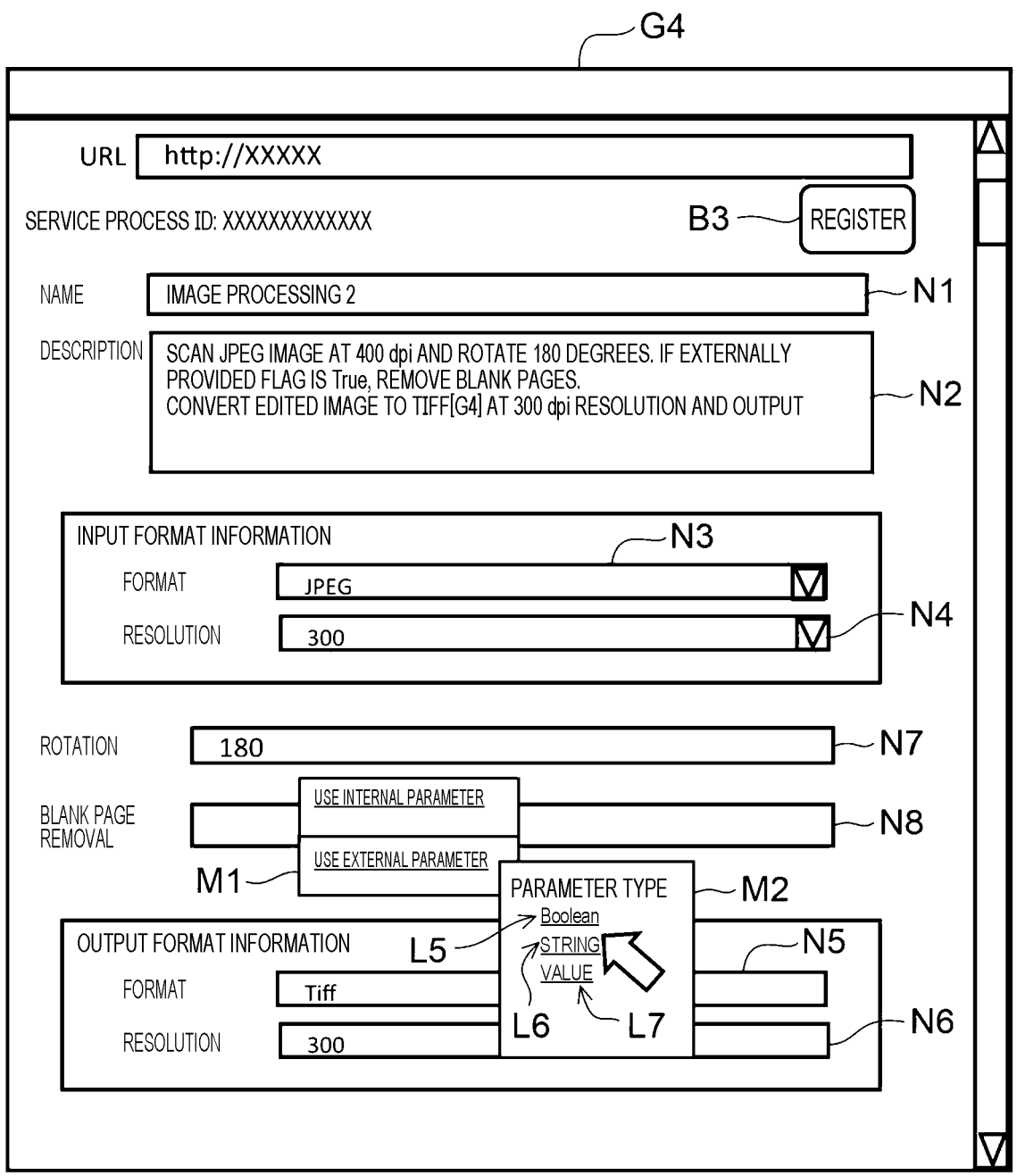
FIG. 12 is a diagram illustrating one example of a service process editing screen.

Furthermore, in the case in which the link L4 is pressed, as illustrated in FIG. 12, a menu M2 for specifying the parameter type of "Blank page removal" to treat as the external parameter is displayed. In the example of FIG. 12, the menu M2 includes links L5 to L7 for selecting "Boolean", "String", and "Value". At this point, by having the user press a desired link, the parameter type of "Blank page removal" is set. Note that in the case in which the parameter type is predetermined, only the set type may be displayed, or the display of the type may be omitted to keep the user from making a selection.

In the example in FIG. 12, the selected service process is image processing. Specifically, a document in JPEG format at a resolution of 300 dpi is input, and the input document is rotated 180 degrees. Also, whether or not to perform blank page removal is decided according to an external parameter (Boolean type), the process is executed on the input document, and the result of the process is output in TIFF format at a resolution of 300 dpi.

Additionally, if the user edits relevant information and presses the Register button B3, the information input into each input field is registered in the service process DB 20B.

Note that a similar process is executed in the case in which an upstream service process or a downstream service process is selected.

In the case in which the selected service process is edited in this way, at least one of the upstream service processes and the downstream service processes may also be re-extracted similarly to the process of step S108. In this case, at least one of the re-extracted upstream service processes and downstream service processes may be displayed on the display unit 16, the user may be made to select at least one of the upstream service processes and the downstream service processes again, and a process flow may be generated again.

In step S122, it is determined whether or not there is another operation besides the operation of selecting a service process. Subsequently, in the case in which there is another operation, the flow proceeds to step S124, whereas in the case in which there is not another operation, the flow proceeds to step S126.

In step S124, a process corresponding to the other operation is executed. The other operation may be an operation of pressing the Add New button B1 on the service process list screen G1 illustrated in FIG. 4 for example. In the case in which the Add New button B1 is pressed, in step S124, a process of registering a new service process is executed. Specifically, a registration screen G5 like the one illustrated in FIG. 13 is displayed on the display unit 16.

Figure 13:
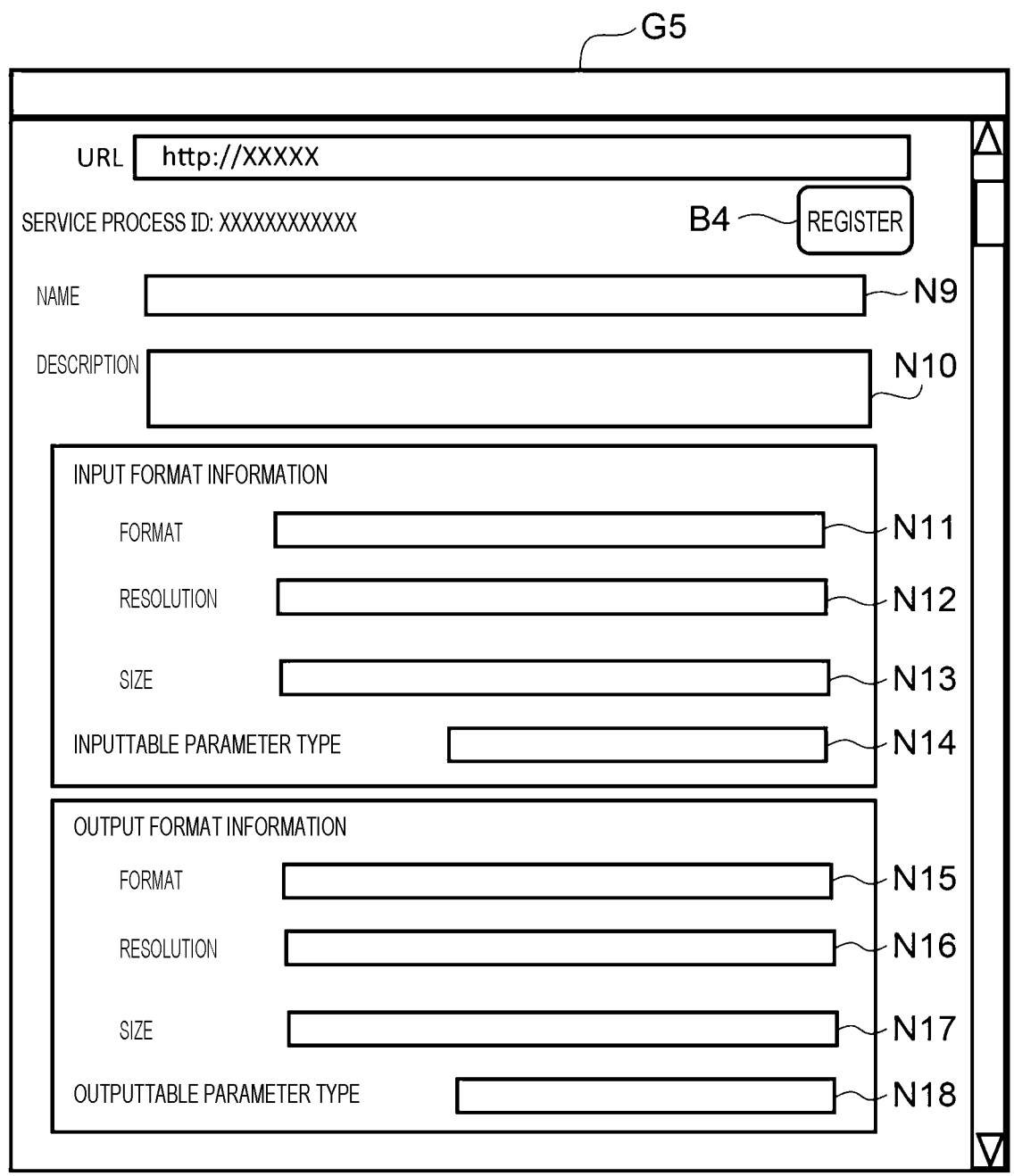
FIG. 13 is a diagram illustrating one example of a new service process registration screen.

As illustrated in FIG. 13, on the registration screen G5, the service process ID of the service process to newly register is displayed. This service process ID is generated as an ID that does not duplicate the service process ID of another service process already registered in the service process DB 20B.

Also, on the registration screen G5, with regard to the service process to newly register, a input field N9 for inputting the name, an input field N10 for inputting the explanation of the service process, input fields N11 to N13 for inputting the format, resolution, and size of the input format information, an input field N14 for inputting the inputtable parameter type, input field N15 to N17 for inputting the format, resolution, and size of the output format information, an input field N18 for inputting the outputtable parameter type, and a Register button B4 are displayed.

The user inputs a desired value or string into each input field. For example, in the case of the format of the input format information, the user inputs supported formats as strings concatenated with commas "," such as "tiff, bmp, png, pdf, xdw".

Also, in the case of inputting the resolution of the input format information, the user inputs "Not Specified" if no restriction is placed on resolution. Also, in the case of specifying the resolution, the user specifies a resolution range by inputting numerical values or by inputting a combination of a numerical value and a string such as "or less", "less than", or "or greater".

Also, in the case of inputting the size of the input format information, the user inputs "Not Specified" if no restriction is placed on size. Also, in the case of specifying the size, the user specifies a size range by inputting numerical values or by inputting a combination of a numerical value and a string such as "or less", "less than", or "or greater".

Also, in the case of inputting the inputtable parameter type, the user inputs supported types as strings concatenated with commas "," such as "string, value, Boolean, date, time, currency".

Also, for unsupported input attributes, the user specifies "N/A". In the case of inputting "N/A" for all input attributes, the user specifies that the service process does not receive input data, or in other words, that the service process does not require the extraction of upstream service processes. Note that since the input of the output format information is similar to the input format information, a description is omitted.

Additionally, if the user inputs relevant information and presses the Register button B4, the information input into each input field is registered in the service process DB 20B.

Note that although the above describes the case of the user inputting service process information such as the input attributes and the output attributes, the service process information may also be set automatically. For example, rules for extracting service process information are pre-stored in the storage unit 20 in a settings file format interpretable by the flow generation device 10.

Subsequently, in the case in which a file including service process information is input into the flow generation device 10 by the user, the service process information is extracted from the input file in accordance with the rules stated in the settings file, and registered in the service process DB 20B. This arrangement saves the user from the burden of inputting the service process information one at a time.

Also, the other operation may be an operation of pressing the Display Settings button B2 on the service process list screen G1 illustrated in FIG. 4 for example. In the case in which the Display Settings button B2 is pressed, in step S124, a process of displaying multiple service processes grouped is executed. Specifically, a display settings screen G6 like the one illustrated in FIG. 14 is displayed on the display unit 16.

Figure 14:
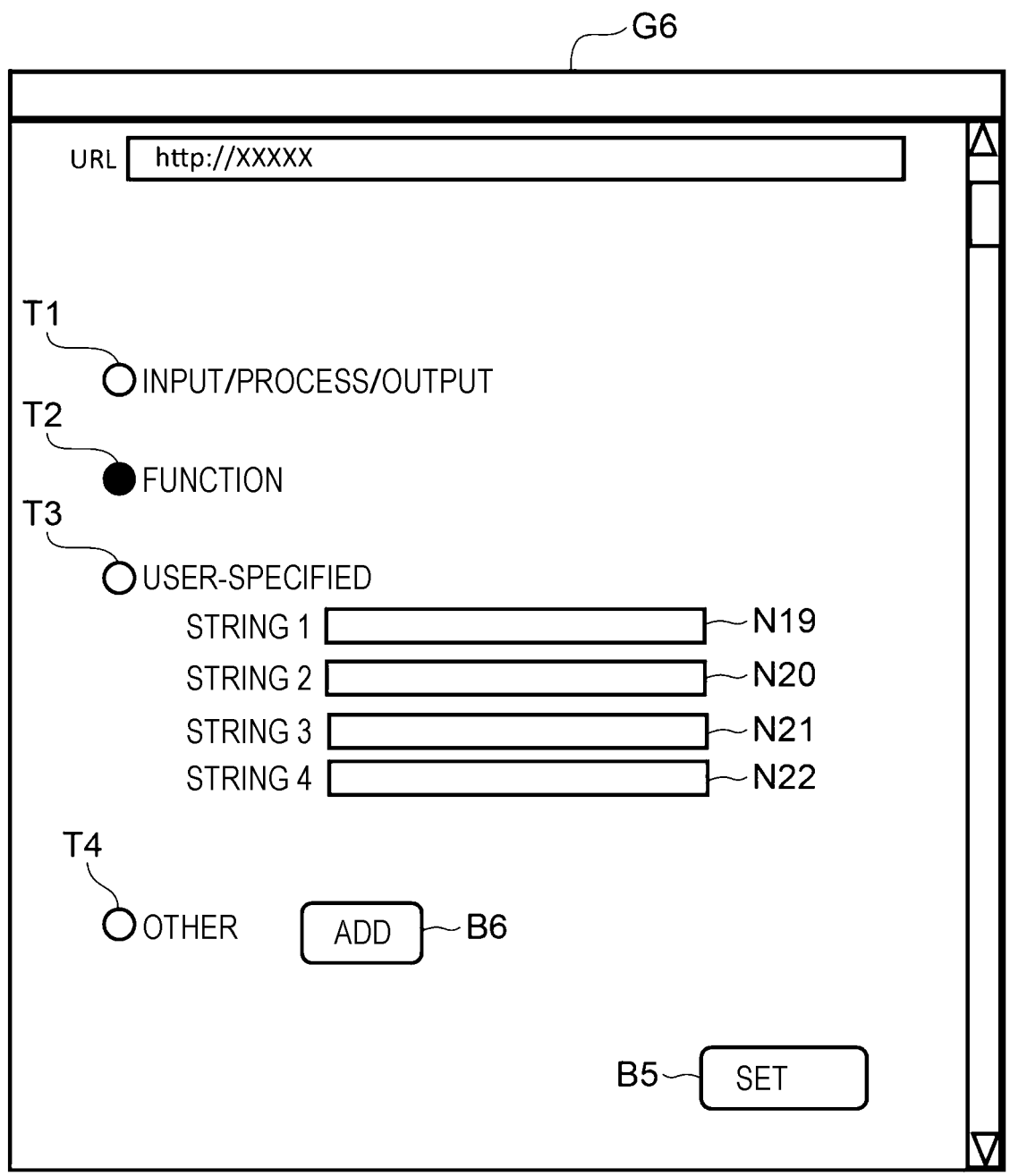
FIG. 14 is a diagram illustrating an example of a display settings screen.

As illustrated in FIG. 14, the display settings screen G6 is a screen for receiving a first grouping condition for grouping multiple service processes. In the example of FIG. 14, setting tabs T1 to T4 for setting the first grouping condition are displayed. If the user makes a selection by pressing one of the setting tabs, the selected setting tab is displayed with a black circle. Subsequently, if the user presses a Set button B5, the multiple service processes registered in the service process DB 20B are displayed on the display unit 16 grouped on the basis of the first grouping condition set by the setting tab.

For example, in the case in which the setting tab T1 is pressed, multiple service processes are grouped by classification on the basis of the service process information. The classifications of the service processes are determined according to whether or not the service process receives input data and whether or not the service process outputs output data.

Specifically, service processes that output output data without receiving input data, that is, service processes for which the input attributes are all "N/A" and at least a portion of the output attributes is other than "N/A", are grouped as output-only service processes.

Also, service processes that receive input data and also output output data, that is, service processes for which at least a portion of the input attributes is other than "N/A" and at least a portion of the output attributes is other than "N/A", are grouped as processing service processes that process input data and output the processing result as output data.

Also, service processes that receive input data but do not output output data, that is, service processes for which at least a portion of the input attributes is other than "N/A" and all of the output attributes are "N/A", are grouped as input-only service processes.

Figure 15:
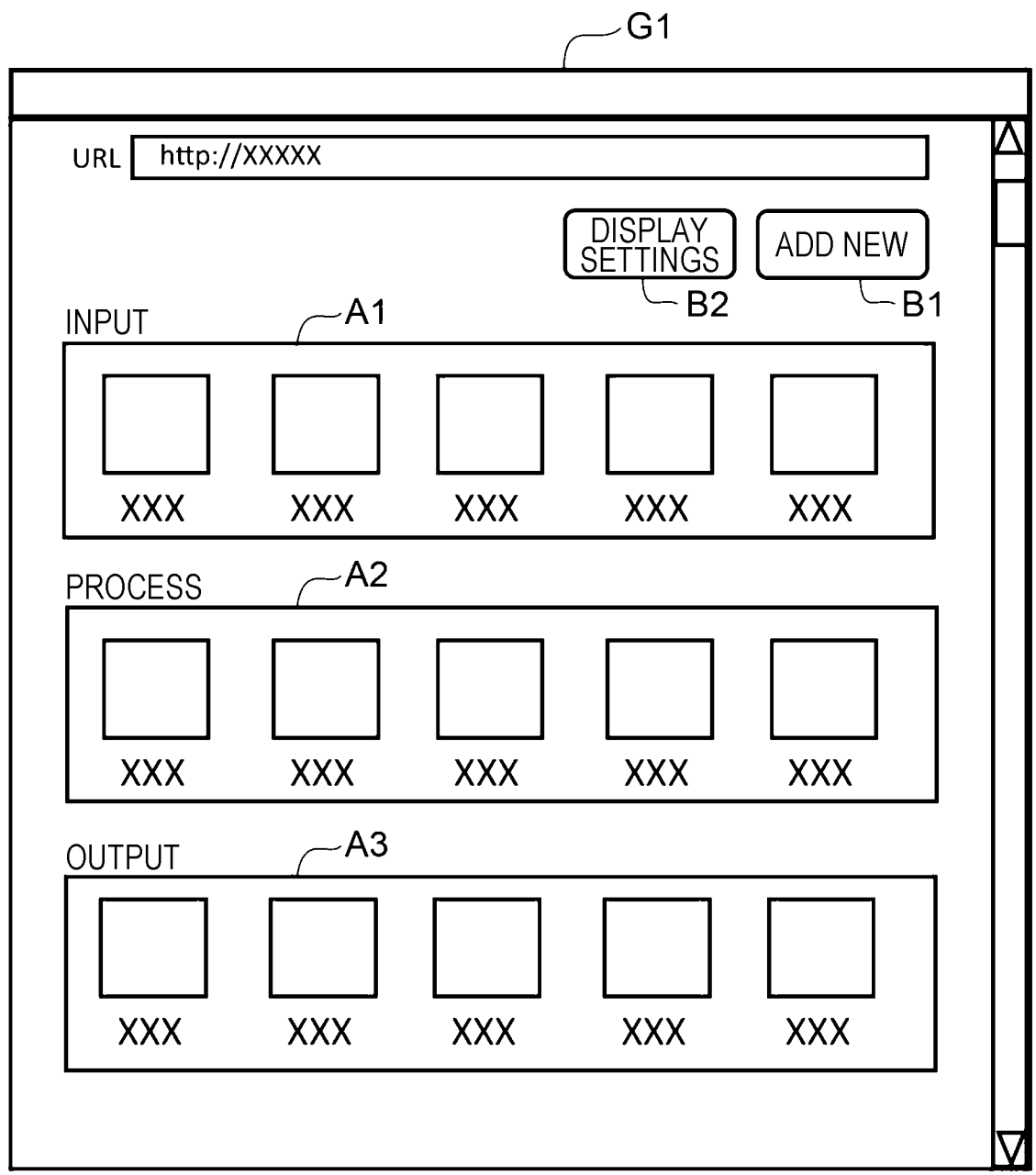
FIG. 15 is a diagram illustrating one example of a display of grouped service processes.

FIG. 15 illustrates an example of grouping service processes by classification. As illustrated in FIG. 15, input-only service processes, processing service processes, and output-only service processes are grouped and displayed in respective display areas A1 to A3. With this arrangement, it becomes easier for the user to grasp the classifications of the service processes.

Figure 16:
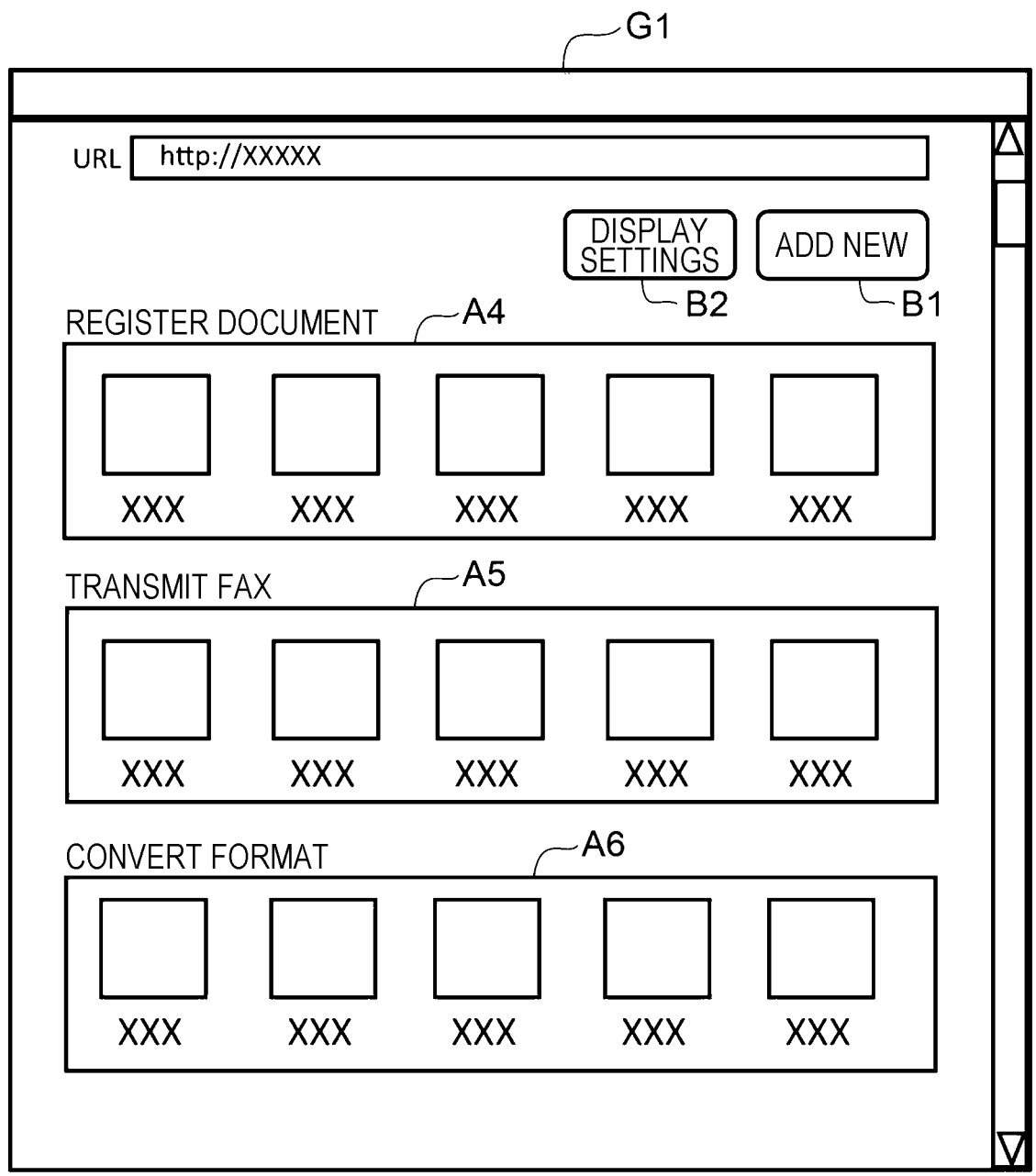
FIG. 16 is a diagram illustrating one example of a display of grouped service processes.

Also, in the case in which the setting tab T2 is pressed, multiple service processes are grouped by function. Specifically, service processes are grouped by extracting strings expressing functions from the names and explanations for example among the service process information. For example, as illustrated in FIG. 16, service processes grouped by function, such as service processes related to document registration, service processes related to fax transmission, and service processes related to format conversion, are displayed in respective display areas A4 to A6.

Figure 17:
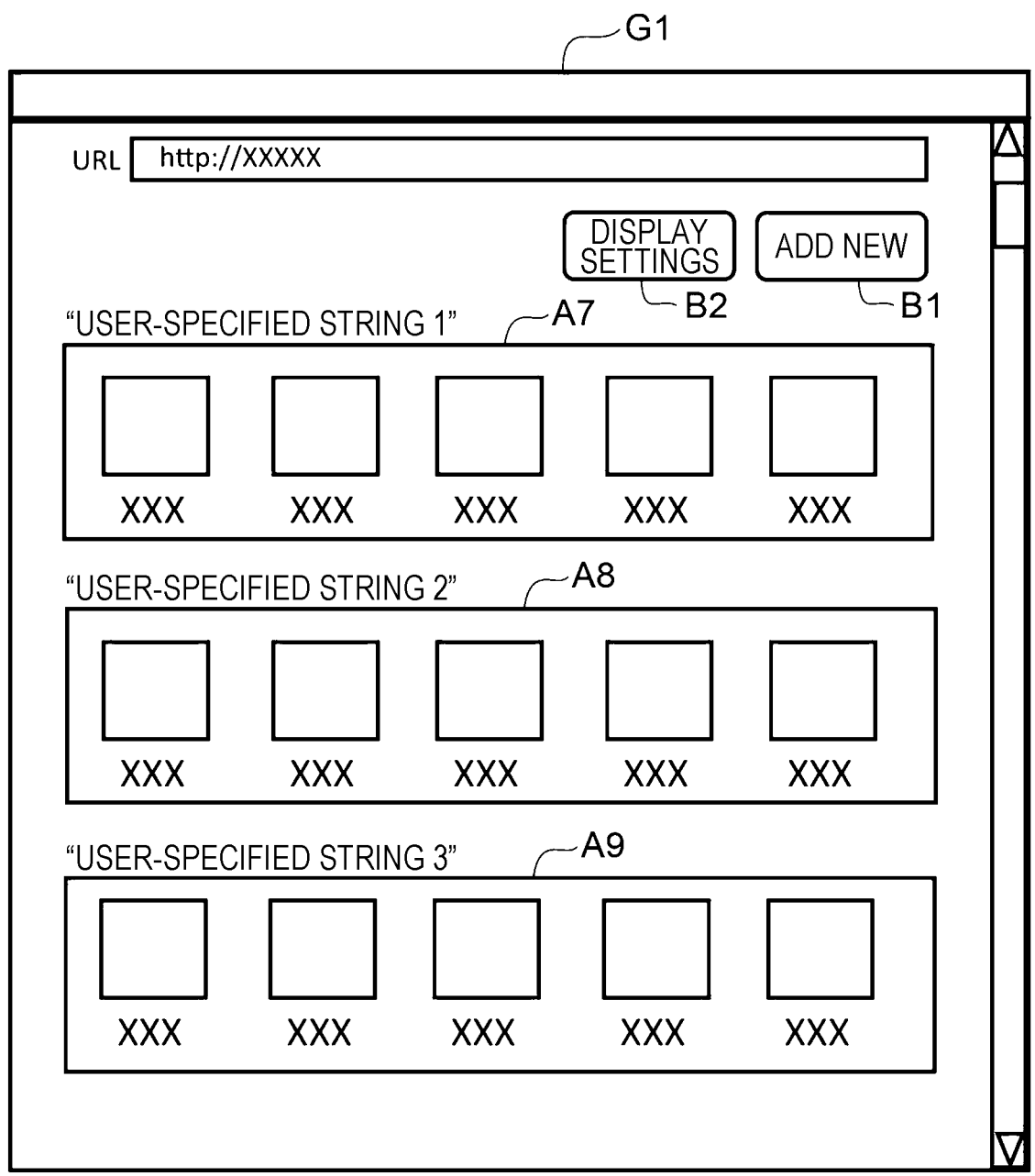
FIG. 17 is a diagram illustrating one example of a display of grouped service processes.

Also, in the case in which the setting tab T3 is pressed, multiple service processes are grouped by strings input into input fields N19 to N22 for inputting user-specified strings. Specifically, service processes are grouped by extracting the service processes that contain the user-specified strings in the service process information. In this case, as illustrated in FIG. 17 for example, service processes grouped according to the user-specified strings are displayed in respective display areas A7 to A9.

Also, in the case in which the setting tab T4 is pressed, the user presses an Add button B6 and sets a grouping condition other than the classifications of service processes, the functions of service processes, and the user-specified strings. In this case, multiple service processes are displayed grouped according to the set grouping condition on the basis of the service process information.

Note that grouping data for grouping may also be pre-registered in the service process DB 20B, and service processes may be grouped on the basis of the grouping data.

In step S126, it is determined whether or not there is an operation giving an end instruction. Subsequently, in the case in which there is an operation giving an end instruction, the current routine is ended. On the other hand, in the case in where there is not an operation giving an end instruction, the flow returns to step S102 and a process similar to the above is repeated.

In this way, in the present exemplary embodiment, in the case in which the selected service process selected by the user is a process that receives input data, one or more upstream service processes which have output attributes that satisfy at least a portion of the input attributes of the input data, and which are also executed upstream from the selected service process, are extracted and displayed. Also, in the case in which the selected service process is a process that outputs output data, one or more downstream service processes which have input attributes that satisfy at least a portion of the output attributes of the output data, and which are also executed downstream from the selected service process, are extracted and displayed. With this arrangement, it is not necessary for the user to make judgments one at a time about service processes combinable under certain conditions to generate a process flow.

The foregoing describes an exemplary embodiment, but the technical scope of the present disclosure is not limited to the scope described in the foregoing exemplary embodiment. Various modifications or alterations may be made to the foregoing exemplary embodiment within a scope that does not depart from the gist of the present disclosure, and any embodiments obtained by such modifications or alterations are also included in the technical scope of the present disclosure.

Also, on the service process list screen G1 in FIG. 4, a refinement condition for refining at least one of the upstream service processes and the downstream service processes extracted in step S108 may be received. Similarly to the case of grouping service processes for example, it may be configured such that classifications or functions of service processes, user-specified strings, or some other condition is received as the refinement condition. In the case in which a refinement condition is received, in step S108, at least one of upstream service processes and downstream service processes satisfying the received refinement condition is extracted. With this arrangement, it becomes easier for the user to select at least one of the upstream service processes and the downstream service processes.

Also, on the service process list screen G1 in FIG. 4, a second grouping condition for grouping at least one of the upstream service processes and the downstream service processes extracted in step S108 of FIG. 3 may be received. In this case, in step S108, at least one of the extracted upstream service processes and downstream service processes are displayed on the display unit 16 grouped in accordance with the received second grouping condition.

Note that, similarly to the case of grouping service processes for example, it may be configured such that classifications or functions of service processes, user-specified strings, or some other condition is received as the second grouping condition.

Figure 18:
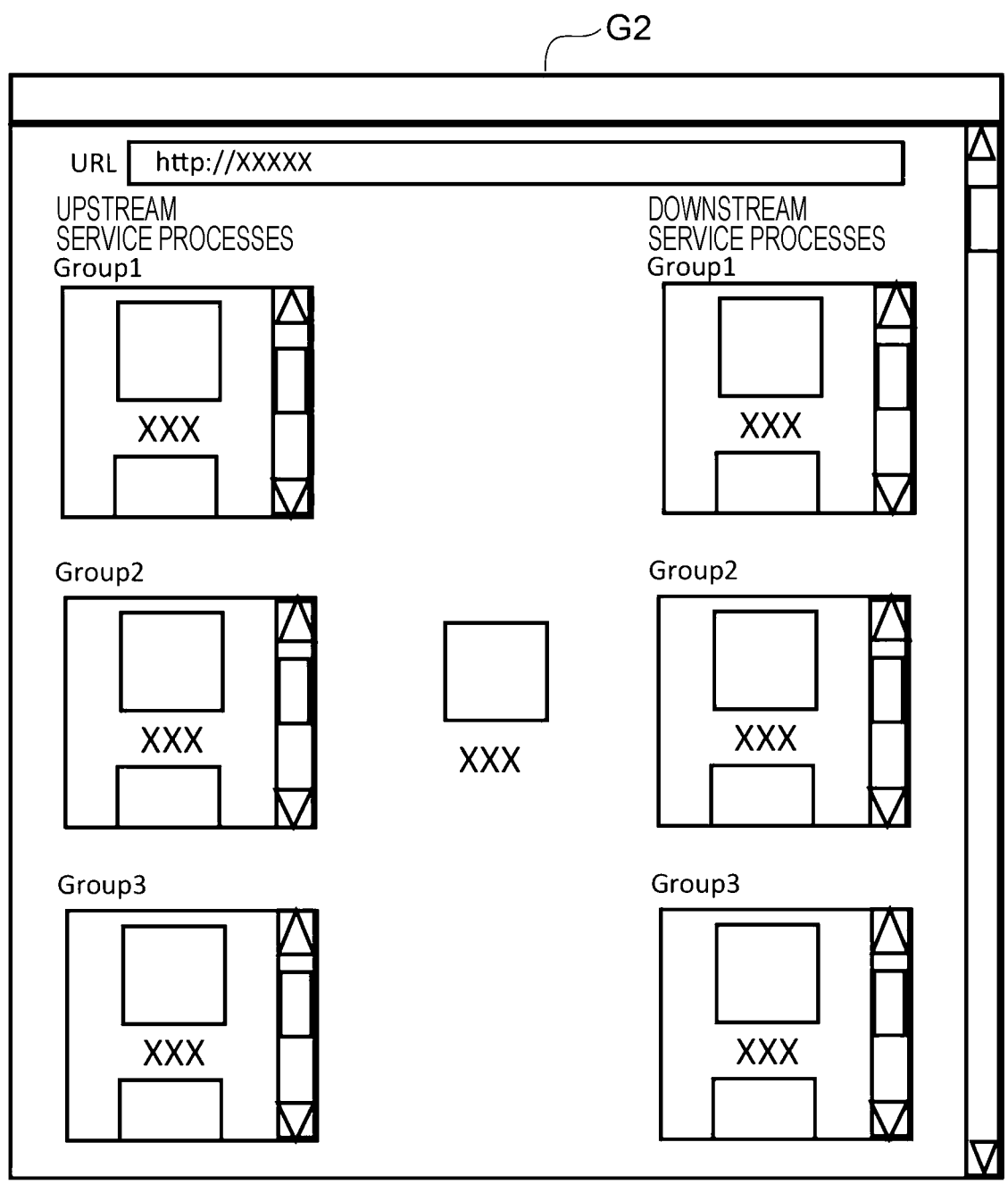
FIG. 18 is a diagram illustrating one example of a display of grouped upstream service processes and downstream service processes.

FIG. 18 illustrates an example of displaying upstream service processes and downstream service processes grouped. In the example of FIG. 18, the upstream service processes and the downstream service processes are both displayed grouped into Groups 1 to 3. For example, service processes grouped by the classification of the service process are displayed in Group 1, service processes grouped by the function of the service process are displayed in Group 2, and service processes grouped by a user-specified string are displayed in Group 3. With this arrangement, it becomes easier for the user to select at least one of the upstream service processes and the downstream service processes.

Note that the foregoing exemplary embodiment does not limit the present disclosure as stated in the claims, and not all combinations of features described in the exemplary embodiment are necessarily required as means for addressing the issues of the present disclosure. The exemplary embodiment described above includes various levels of invention, and the various inventions are elicited through the combination of the multiple structural elements disclosed herein. Even if several structural elements are removed from among all of the structural elements illustrated in the exemplary embodiment, the configuration with the several structural elements removed therefrom may still be elicited as an invention insofar as an effect is obtained.

Also, the foregoing exemplary embodiment describes a case in which the flow generation program 20A is preinstalled in the storage unit 20, but the present disclosure is not limited thereto. For example, the flow generation program 20A may also provided with it stored on a storage medium such as Compact Disc-Read-Only Memory (CD-ROM), or may be provided over a network.

Furthermore, the foregoing exemplary embodiment describes a case in which the flow generation process is achieved by a software configuration using a computer by executing a program, but the present disclosure is not limited thereto. For example, the flow generation process may also be achieved by a hardware configuration, or by a combination of a hardware configuration and a software configuration.

Otherwise, the configuration of the flow generation device 10 (see FIG. 1) described in the foregoing exemplary embodiment is a single example, and obviously, unnecessary portions may be removed or new portions may be added within a scope that does not depart from the gist of the present disclosure.

Also, the process flow of the flow generation program (see FIG. 3) described in the foregoing exemplary embodiment is a single example, and obviously, unnecessary steps may be removed, new steps may be added, or the processing sequence may be rearranged within a scope that does not depart from the gist of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A flow generation device comprising:
   a processor programmed to:
   receive a selected service process selected by a user from among a plurality of service processes for generating a sequential process flow;
   upon determining that the selected service process is a process that receives input data and outputs output data,
      extract one or more candidate upstream service processes, from among the plurality of service processes, which have output attributes satisfying at least a portion of input attributes of the input data of the selected service process and which are also executed upstream from the selected service process, and
      extract one or more candidate downstream service processes, from among the plurality of service processes, which have input attributes satisfying at least a portion of output attributes of the output data of the selected service process and which are also executed downstream from the selected service process;

concurrently display on a display the selected service process, the extracted one or more candidate upstream service processes, and the extracted one or more candidate downstream service processes;

receive an upstream service process selected from among the one or more candidate upstream service processes displayed on the display, and receive a downstream service process selected from among the one or more candidate downstream service processes displayed on the display; and generate a process flow in which the selected service process, the upstream service process, and the downstream service process are defined.

2. The flow generation device according to claim 1, wherein the input attributes include at least one of input format information related to a format of the input data that is receivable by the selected service process, and an inputtable parameter type that is inputtable into the selected service process.

3. The flow generation device according to claim 1, wherein the output attributes include at least one of output format information related to a format of the output data that the selected service process outputs, and an outputtable parameter type that is outputtable by the selected service process.

4. The flow generation device according to claim 1, wherein the processor is further programmed to receive a refinement condition for refining at least one of the candidate upstream service processes and the candidate downstream service processes, such that the processor extracts a process satisfying the refinement condition as the candidate upstream or downstream service process.

5. The flow generation device according to claim 1, wherein the processor is further programmed to cause a notification to be issued in at least one of:

a case in which an output attribute not matching an input attribute of the selected service process exists among output attributes of the received upstream service process, and a case in which an input attribute not matching an output attribute of the selected service process exists among input attributes of the received downstream service process.

6. The flow generation device according to claim 5, wherein the processor is further programmed to execute at least one of:

a process causing an output attribute matching an input attribute of the selected service process and an output attribute not matching an input attribute of the selected service process from among the output attributes of the received upstream service process, to be displayed distinguished from each other, and a process causing an input attribute matching an output attribute of the selected service process and an input attribute not matching an output attribute of the selected service process from among the input attributes of the received downstream service process, to be displayed distinguished from each other.

7. The flow generation device according to claim 1, wherein in a case in which a certain service process is indicated by the user from among the selected service process, the extracted one or more candidate upstream service processes, and the extracted one or more candidate downstream service processes, the processor causes at least one of an input attribute, an output attribute, and an explanation of the indicated certain service process, to be displayed on the display.

8. The flow generation device according to claim 1, wherein the processor is further programmed to:

receive a first grouping condition for grouping the plurality of service processes; and cause the display to display the plurality of service processes grouped in accordance with the first grouping condition.

9. The flow generation device according to claim 1, wherein the processor is further programmed to:

receive a second grouping condition for grouping at least one of the extracted one or more candidate upstream service processes and the extracted one or more candidate downstream service processes; and cause the display to display at least one of the extracted one or more candidate upstream service processes and the extracted one or more candidate downstream service processes grouped in accordance with the second grouping condition.

10. The flow generation device according to claim 1, wherein the processor is further programmed to register the generated process flow.

11. The flow generation device according to claim 10, wherein the processor is further programmed to edit the registered process flow.

12. The flow generation device according to claim 11, wherein in a case in which a service process included in the registered process flow is edited, the processor re-extracts at least one of a candidate upstream service process and a candidate downstream service process corresponding to the edited service process.

13. The flow generation device according to claim 1, wherein the processor is further programmed to register a new service process.

14. The flow generation device according to claim 13, wherein the processor is further programmed to edit the registered new service process.

15. A non-transitory computer readable medium storing a program causing a computer to execute a process for generating a flow, the process comprising:

receiving a selected service process selected by a user from among a plurality of service processes for generating a sequential process flow;

upon determining that the selected service process is a process that receives input data and outputs output data, extracting one or more candidate upstream service processes, from among the plurality of service processes, which have output attributes satisfying at least a portion of input attributes of the input data of the selected service process and which are also executed upstream from the selected service process, and extracting one or more candidate downstream service processes, from among the plurality of service processes, which have input attributes satisfying at least a portion of output attributes of the output data of the selected service process and which are also executed downstream from the selected service process;

concurrently displaying on a display the selected service process, the extracted one or more candidate upstream service processes, and the extracted one or more candidate downstream service processes;

receiving an upstream service process selected from among the one or more candidate upstream service processes displayed on the display, and receiving a downstream service process selected from among the one or more candidate downstream service processes displayed on the display; and generating a process flow in which the selected service process, the upstream service process, and the downstream service process are defined.

16. A flow generation device comprising:

first receiving means for receiving a selected service process selected by a user from among a plurality of service processes for generating a sequential process flow;

extracting means for, upon determining that the selected service process is a process that receives input data and outputs output data, extracting one or more candidate upstream service processes, from among the plurality of service processes, which have output attributes satisfying at least a portion of input attributes of the input data of the selected service process and which are also executed upstream from the selected service process, and extracting one or more candidate downstream service processes, from among the plurality of service processes, which have input attributes satisfying at least a portion of output attributes of the output data of the selected service process and which are also executed downstream from the selected service process;

controlling means for concurrently display on a display the selected service process, the extracted one or more candidate upstream service processes, and the extracted one or more candidate downstream service processes;

second receiving means for receiving an upstream service process selected from among the one or more candidate upstream service processes displayed on the display, and receiving a downstream service process selected from among the one or more candidate downstream service processes displayed on the display; and generating means for generating a process flow in which the selected service process, the upstream service process, and the downstream service process are defined.

* * * * *